US006473080B1

(12) United States Patent
Brown et al.

(10) Patent No.: US 6,473,080 B1
(45) Date of Patent: Oct. 29, 2002

(54) STATISTICAL COMPARATOR INTERFACE

(75) Inventors: Bruce Leonard Brown, Provo; Kent Allen Hendrix; Suzanne Brown Hendrix, both of Orem, all of UT (US)

(73) Assignee: Baker & Taylor, Inc., Charlotte, NC (US)

( * ) Notice: Subject to any disclaimer, the term of this patent is extended or adjusted under 35 U.S.C. 154(b) by 0 days.

(21) Appl. No.: 09/264,972

(22) Filed: Mar. 9, 1999

Related U.S. Application Data

(60) Provisional application No. 60/077,623, filed on Mar. 10, 1998.

(51) Int. Cl.$^7$ ................................................. G06T 15/00
(52) U.S. Cl. ........................................................ 345/419
(58) Field of Search ................................ 345/418, 419, 345/433, 619, 625

(56) References Cited

U.S. PATENT DOCUMENTS

| | | | | |
|---|---|---|---|---|
| 5,805,167 A | | 9/1998 | van Cruyningen | .......... 345/535 |
| 5,835,384 A | | 11/1998 | Lin | .............................. 364/552 |
| 5,864,871 A | | 1/1999 | Kitain et al. | ................. 707/104 |

OTHER PUBLICATIONS

Brown, B.L. et al., "Compensating for Measurement Error in Multivariate Graphs: An Assessment of Algorithms used in Isoquant Projection Plots", *American Statistical Association 1998, Proceedings of the Section on Statistical Graphics*, Alexandria, Virginia: American Statistical Association, pp. 34–38.

Hendrix, S.B. et al., "The Surface of ordered profiles: A Multivariate Graphical Data Analysis Method", *The American Statistical Association 1990, Proceedings of the Section on Statistical Graphics*, Virginia: American Statistical Association, pp. 54–59.

Hirsh, N.S. et al., "A Holistic Method for Visualizing Computer Performance Measurements", in G. Nielson and B. Shriver (Eds.), *Tutorial: Visualization in Scientific Computing*, IEEE Press, 1990, pp 190–208.

Brown, B.L. et al., PRIFAC: A Pascal Factor Analysis Program, *Journal of Pascal, Afa and Modula–2*, 3(2) pp. 18–24.

Gabriel, K.R., "The Biplot Graphic Display of Matrices with Applications to Principal Components Analysis", *Biometrika*, 58, 453–467.

*Primary Examiner*—Phu K. Nguyen
(74) *Attorney, Agent, or Firm*—Pate Pierce & Baird

(57) ABSTRACT

A Statistical Comparator Interface provides a user with the capability to reduce vast amounts of raw data into a readily navigable and quickly comprehendible form. The Statistical Comparator Interface is embodied in two basic stages. In a data compilation stage, a compilation module, which is preferably implemented with computer software, receives the raw data and compiles the raw data into a format that is readily navigable by a navigation engine. This may include expanding the data through statistical computations and arranging the data in a data matrix complete with hierarchal indices. In a navigation stage, the navigation engine is employed to allow a user to generate data profiles from among the formatted data, including selecting a peer group with selected characteristics and selecting statistical comparisons to be calculated and displayed for the selected peer group. The navigation stage may also allow the user to select from among a plurality of graphical depiction schemes to display the selected statistical comparisons in a manner that is readily comprehendible to a lay, unindoctrinated user. The graphical display schemes preferably employ multivariate statistical methods such as MANOVA, discriminate analysis, multivariate multiple regression, etc., and multivariate graphing methods such as three-dimensional scatter plots and ordered profile surfaces to display the highly complex data in a readily understandable format.

27 Claims, 15 Drawing Sheets

|    | 1     | 2     | 3     | 4     | 5     | 6     | 7     | 8     | 9     | 10    | 11    | 12    |
|----|-------|-------|-------|-------|-------|-------|-------|-------|-------|-------|-------|-------|
| 1  | 1.00  | 0.99  | 0.98  | 0.95  | -0.50 | -0.59 | -0.67 | -0.74 | -0.50 | -0.41 | -0.31 | -0.21 |
| 2  | 0.99  | 1.00  | 0.99  | 0.98  | -0.41 | -0.50 | -0.59 | -0.67 | -0.59 | -0.50 | -0.41 | -0.31 |
| 3  | 0.98  | 0.99  | 1.00  | 0.99  | -0.31 | -0.41 | -0.50 | -0.59 | -0.67 | -0.59 | -0.50 | -0.41 |
| 4  | 0.95  | 0.98  | 0.99  | 1.00  | -0.21 | -0.31 | -0.41 | -0.50 | -0.74 | -0.67 | -0.59 | -0.50 |
| 5  | -0.50 | -0.41 | -0.31 | -0.21 | 1.00  | 0.99  | 0.98  | 0.95  | -0.50 | -0.59 | -0.67 | -0.74 |
| 6  | -0.59 | -0.50 | -0.41 | -0.31 | 0.99  | 1.00  | 0.99  | 0.98  | -0.41 | -0.50 | -0.59 | -0.67 |
| 7  | -0.67 | -0.59 | -0.50 | -0.41 | 0.98  | 0.99  | 1.00  | 0.99  | -0.31 | -0.41 | -0.50 | -0.59 |
| 8  | -0.74 | -0.67 | -0.59 | -0.50 | 0.95  | 0.98  | 0.99  | 1.00  | -0.21 | -0.31 | -0.41 | -0.50 |
| 9  | -0.50 | -0.59 | -0.67 | -0.74 | -0.50 | -0.41 | -0.31 | -0.21 | 1.00  | 0.99  | 0.98  | 0.95  |
| 10 | -0.41 | -0.50 | -0.59 | -0.67 | -0.59 | -0.50 | -0.41 | -0.31 | 0.99  | 1.00  | 0.99  | 0.98  |
| 11 | -0.31 | -0.41 | -0.50 | -0.59 | -0.67 | -0.59 | -0.50 | -0.41 | 0.98  | 0.99  | 1.00  | 0.99  |
| 12 | -0.21 | -0.31 | -0.41 | -0.50 | -0.74 | -0.67 | -0.59 | -0.50 | 0.95  | 0.98  | 0.99  | 1.00  |

*Fig. 10*

|    | 1     | 2     | 3     | 4     | 5     | 6     | 7     | 8     | 9     | 10    |
|----|-------|-------|-------|-------|-------|-------|-------|-------|-------|-------|
| 1  | 1.00  | 0.81  | 0.31  | -0.31 | -0.81 | -1.00 | -0.81 | -0.31 | 0.31  | 0.81  |
| 2  | 0.81  | 1.00  | 0.81  | 0.31  | -0.31 | -0.81 | -1.00 | -0.81 | -0.31 | 0.31  |
| 3  | 0.31  | 0.81  | 1.00  | 0.81  | 0.31  | -0.31 | -0.81 | -1.00 | -0.81 | -0.31 |
| 4  | -0.31 | 0.31  | 0.81  | 1.00  | 0.81  | 0.31  | -0.31 | -0.81 | -1.00 | -0.81 |
| 5  | -0.81 | -0.31 | 0.31  | 0.81  | 1.00  | 0.81  | 0.31  | -0.31 | -0.81 | -1.00 |
| 6  | -1.00 | -0.81 | -0.31 | 0.31  | 0.81  | 1.00  | 0.81  | 0.31  | -0.31 | -0.81 |
| 7  | -0.81 | -1.00 | -0.81 | -0.31 | 0.31  | 0.81  | 1.00  | 0.81  | 0.31  | -0.31 |
| 8  | -0.31 | -0.81 | -1.00 | -0.81 | -0.31 | 0.31  | 0.81  | 1.00  | 0.81  | 0.31  |
| 9  | 0.31  | -0.31 | -0.81 | -1.00 | -0.81 | -0.31 | 0.31  | 0.81  | 1.00  | 0.81  |
| 10 | 0.81  | 0.31  | -0.31 | -0.81 | -1.00 | -0.81 | -0.31 | 0.31  | 0.81  | 1.00  |

*Fig. 11*

STATISTICAL COMPARATOR INTERFACE

RELATED APPLICATIONS

This application is a continuation-in-part of my co-pending U.S. Provisional Patent Application Ser. No. 60/077,623 filed on Mar. 10, 1998 and entitled Statistical Comparator Interface. Application Ser. No. 60/077,623 is hereby incorporated by reference into this document.

BACKGROUND OF THE INVENTION

1. The Field of the Invention

The present invention relates to the automated calculation, navigation, and display of statistical information. More specifically, the present invention relates to automated interfaces for automatically extracting information from unformatted data and for generating and displaying that information for a user in a user-selected format as a readily comprehendible graphical display.

2. The Relevant Technology

Most organizations have a need for large-scale statistical analysis to adequately compare themselves and assess their standing in relation to other peer organizations. To do this on a large scale requires not only that a large amount of data be gathered, but also that some manner of formatting the data, sorting through the data, and presenting the data in a comprehensible manner be available.

As one example, libraries, such as public libraries, school libraries and the like, may desire to know how they stand with regard to other similarly situated libraries. For instance, they may want to know how their expenditures per capita, holdings per capita, size, staff, etc. compare to similarly situated institutions. For a library to conduct such a study, the library would have to poll each library it wished to include in the comparison. Additionally, the library would have to include in the poll at the outset all statistical categories for which it wished to compare itself.

Once the data was collected, the library would then have to compile the data. Such a process is very laborious and time consuming. It is also very inflexible, because each type of statistical comparison, whether it be average holding, mean holding, population represented or size of school, and all combinations of these would have to be separately compiled for each statistical category. Furthermore, if the researcher desired to alter the composition of the control group or, as termed herein, the "peer group," all new calculations would be required.

It has been recognized by those in the relevant art that computer automation can help to meet these needs. Computer automation in the past several decades has contributed greatly to the amount of data available for answering pressing organizational questions. A large amount of data is available from many sources, including U.S. Census data, NCES library statistics, records of financial transactions in the world's markets, etc. In the past few years there has been an incredible proliferation of data in every area. We are "drowning in data and starved for information." The big problem yet to be solved is to make the information contained in this massive amount of data comprehensible and readily accessible to those who need it.

The art has also seen the arrival of several information analysis types of programs. Two types in particular are very relevant for exploiting the value of the many large scale accumulations of data: (1) database management systems and (2) statistical analysis systems. Database management systems, such as Oracle®, Sybase®, Microsoft Access®, etc., have been available for a number of years now. The past thirty years has also seen great advances in the development and availability of statistical analysis systems such as SAS®, S-PSS®, SPlus®, and others. Database management systems are particularly powerful for structuring and organizing large and complex databases. Modem statistical analysis software systems provide an incredible variety of analytical methods for transforming and extracting the information in large databases.

Most database management systems have at least a minimum amount of statistical analysis capability, and statistical analysis software systems usually also have some database manipulation capability. However, the combination of the two is much more powerful in analyzing large scale databases than either alone. In the hands of skilled practitioners, the combination of a good database management system and a good statistical analysis system can create a massive amount of information out of a large scale database. The big problem is in organizing, communicating and interpreting these results. In an afternoon, a user skilled in the use of a powerful database management system and a state-of-the art statistical analysis system could create a room full of printed statistical results-stacks of output that would take perhaps years to interpret by usual methods.

A need exists for a way to deal with this threefold problem of organizing, communicating and interpreting statistical results. The people who have the need of statistical comparisons are frequently not trained in statistical methods. The results of statistical calculations on data are generally indecipherable by a large part of the people who need the information contained therein. To make that information accessible to such people, some manner of navigating through the raw data and presenting the data in a readily comprehensible form to unindoctrinated users is needed.

The key to large scale data analysis is multivariate visualization. That is, one needs holistic pictures of data that communicate information about many variables simultaneously. A number of holistic graphing methods have been developed in recent years, some by the authors of this patent application, based upon multivariate statistical methods. Most of these are in the public domain, and some have been incorporated into commercial packages such as DataDesk (r), McSpin(r), and SAS's INSIGHT(r) and JMP(r). These programs, however, have limited data searching capabilities, and are not capable of calculating and manipulating higher order interactions among variables in truly large data sets. Such programs are also relatively inflexible, quite complex, and generally require the operators of the programs to be highly trained in statistics in order to properly operate the programs to glean useful information from data being operated upon.

The intent of the present invention is to provide a structure and an architecture for bringing a wide variety of graphical and statistical methods together. A need exists to incorporate the incredible data organizing and data analyzing capabilities of database management systems and statistical analysis systems with a wide variety of methods for presenting both the holistic and also the specific properties of data.

In filling this need, a navigation component is needed that combines the best of the multivariate visualization techniques with a variety of traditional graphs and a large variety of statistical indices to create a total analysis and data navigation system that makes high level analysis available to users untrained in statistical methodology.

Such a data gathering and extracting process is needed that can also be used in real time, such as in manufacturing processes, to sort through large amounts of data generated about the on-going processes of the manufacturing plant.

Furthermore, it would also be advantageous to provide a service in connection with a system for analyzing data in which the data is provided in a properly formatted manner and periodically updated by the vendor.

OBJECTS AND BRIEF SUMMARY OF THE INVENTION

The apparatus of the present invention has been developed in response to the present state of the art, and in particular, in response to the problems and needs in the art that have not yet been fully solved by currently available technology. Thus, it is an overall objective of the present invention to provide an improved automated data generation, navigation, and analysis system that overcomes the problems and shortcomings discussed above.

To achieve the foregoing objects, and in accordance with the invention as embodied and broadly described herein in the preferred embodiment, a Statistical Comparator Interface is provided. The Statistical Comparator Interface of the present invention is a large-scale system for complex data navigation and analysis. Additionally, the Statistical Comparator Interface is adaptable for use to analyze both numerical and nonnumerical data. The Statistical Comparator Interface also preferably provides an efficient way of structuring data and complex transformations of that data within memory storage in order to enable optimal interpretation of the entire complex of data structure.

The present invention also encompasses a method, embodied in a set of processes for creating this unique and useful data structure from a broad variety of data input types and for navigating the data structure. Finally, the present invention also encompasses an apparatus. The Statistical Comparator Interface can convert an ordinary digital computer into a high level holistic monitoring device for tracking and ordering complex data sets such as might be seen in manufacturing systems.

The Statistical Comparator Interface provides a user with the capability to reduce vast amounts of raw data into a readily navigable and quickly comprehendible data architecture. In a presently preferred embodiment, the Statistical Comparator Interface is embodied in two basic stages. In a data compilation stage, a compilation module, which is preferably implemented with computer software, receives the raw data and compiles the raw data into a data architecture format that is readily navigable by a navigation engine.

The data architecture preferably comprises a multidimensional matrix. The data architecture matrix in one embodiment is organized into blocks arranged with columns and rows. Each block may, likewise, comprise columns and rows (fields). An initial block may contain the raw data arranged in fields. Additional blocks may reflect statistical manipulations of the raw data, including quantitative data, composite data, and internal field structure coefficients. Indices, including higher order indices (indices of indices) may also be included to facilitate rapid navigation of the data architecture matrix.

In a navigation stage, the navigation engine is employed to allow a user to generate data profiles from among the previously raw data, including selecting one or more peer groups with selected characteristics and selecting raw data and statistical derivations in a palette of categories to be calculated and displayed for each selected peer group.

The navigation stage may also be configured to allow the user to select from among a plurality of graphical depiction schemes to display the selected statistical comparisons in a manner that is readily perceivable to a lay, unindoctrinated user. The graphical depiction schemes preferably employ holistic multivariate analysis techniques such as multivariate analysis of variance (MANOVA) and multivariate multiple regression to create a variety of univariate and multivariate graphs to display the highly complex data in a readily understandable, two dimensional or three dimensional format.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 10 is a clustered correlation matrix given by way of example of one manner of forming a matrix of expanded data of FIG. 3.

FIG. 11 is a commutative correlation matrix given by way of example of one manner of forming a matrix of expanded data of FIG. 3.

DETAILED DESCRIPTION OF THE PREFERRED EMBODIMENTS

Figure 1:
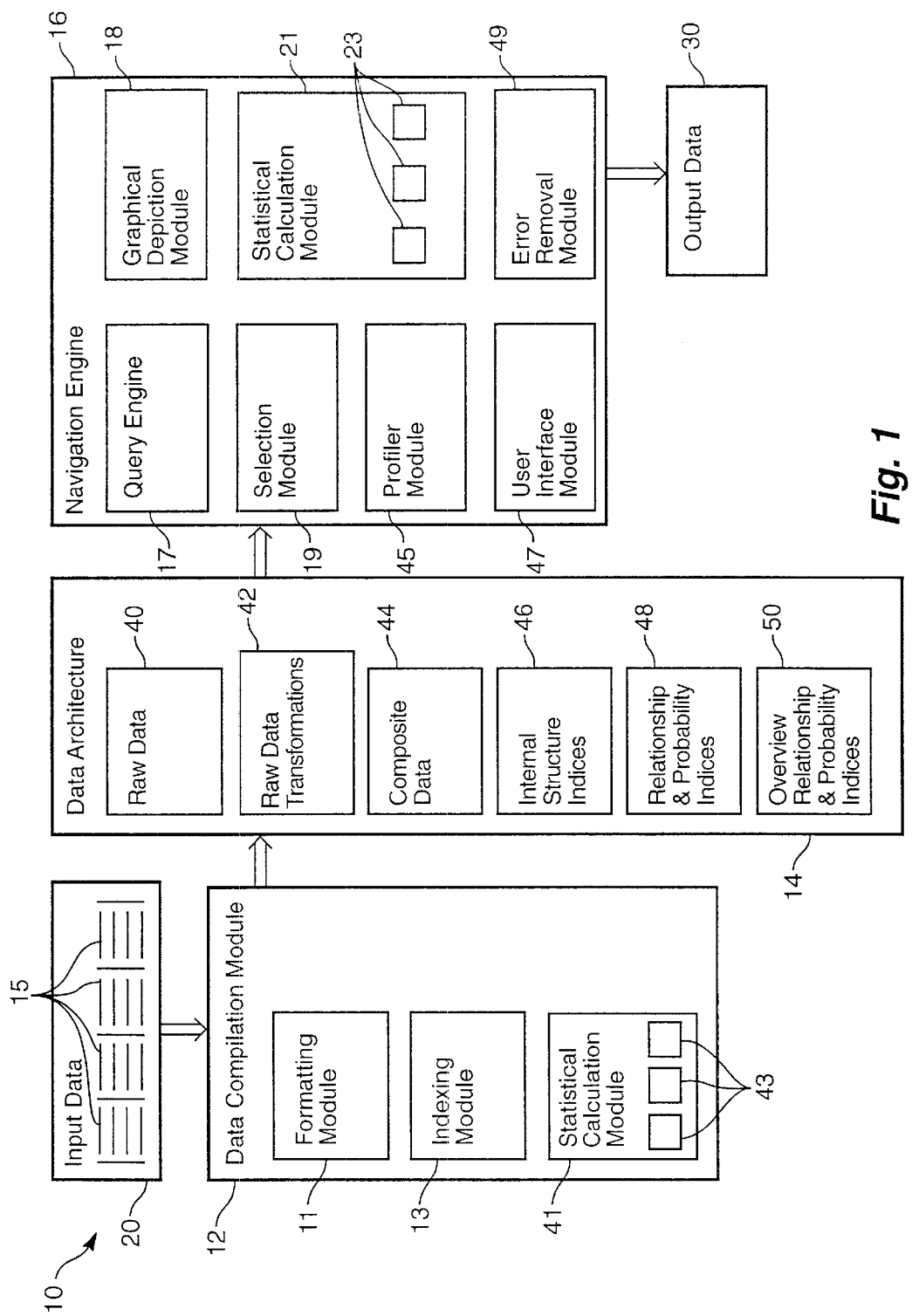
FIG. 1 is a schematic block diagram illustrating generally the system of the present invention.

FIG. 1 is a basic overview of the Statistical Comparator Interface (SCI) 10 of the present invention. In the embodiment of FIG. 1, the SCd 10 is arranged in two basic stages, shown generally in FIG. 1. The first stage comprises a data compilation engine 12 for creating a data architecture 14 that is easily navigable. The second stage comprises a navigation engine 16 for navigating efficiently through immense amounts of information that may be contained within the data architecture 14 generated by the compilation engine 12.

The data compilation engine 12 is preferably implemented in computer software form suitable for execution by a computer system. The computer software preferably comprises data structures and executable instructions (executables) organized in modules for execution by a processor of the computer system 22.

Figure 2:
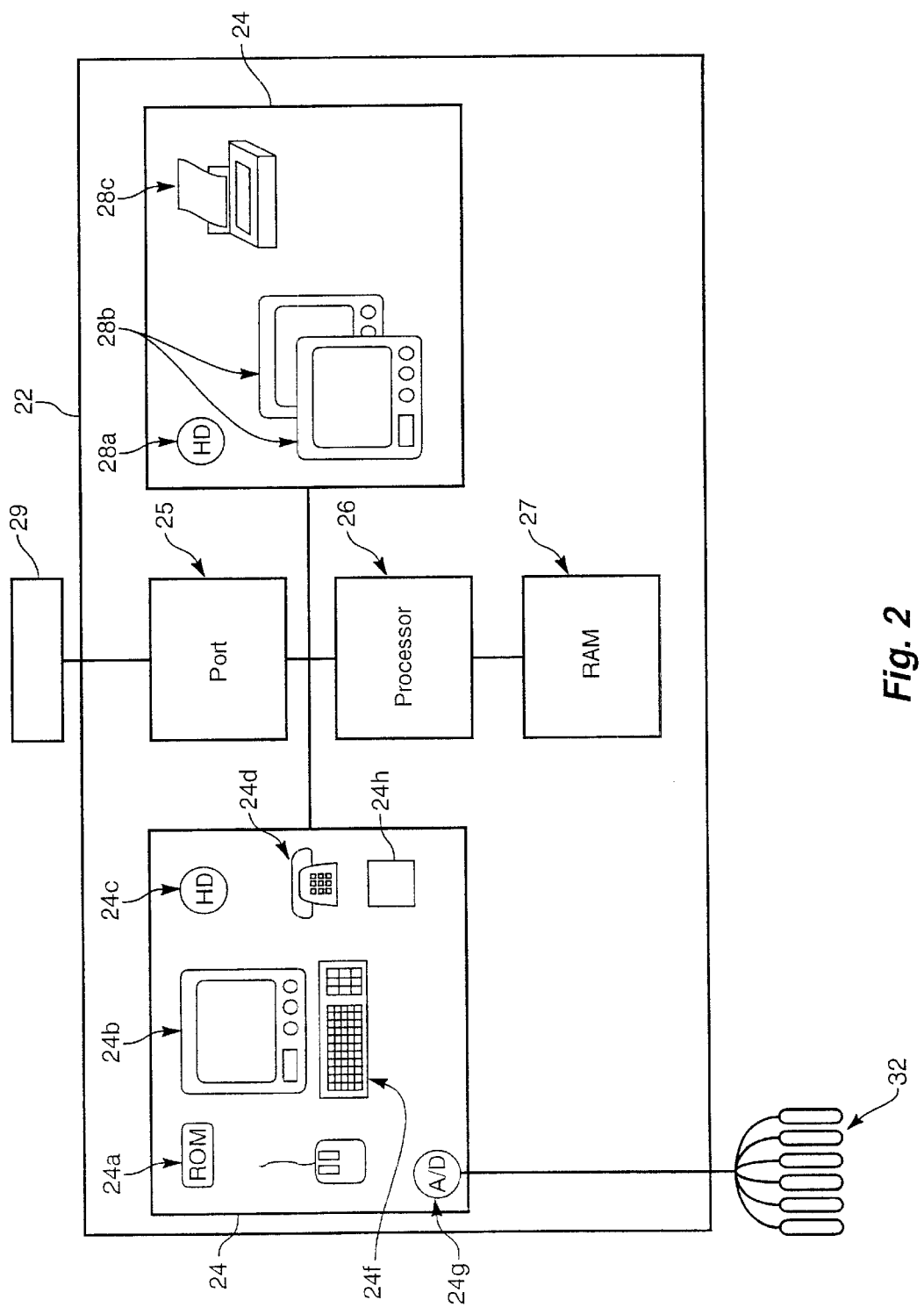
FIG. 2 is a schematic block diagram illustrating a typical computer system for implementing the present invention in computer software form.

FIG. 2 shows one embodiment of a computer system 22 suitable for operation with the SCI system 10 of the present invention. The computer system 22 of FIG. 2 is shown provided with a series of input devices 24, a port 25, a processor 26, RAM memory 27, a set of output devices 28, and a network connection 29.

The input devices shown include a CD ROM disk drive 24a, a monitor 24b, a hard disk drive 24c, a modem 24d, a mouse 24e, a keyboard 24f, an analog to digital converter 24g, which may be connected through the port 28, and a high capacity disk drive 24h, such as a Zip® drive available from Iomega Corporation of Salt Lake City, Utah.

The output devices depicted include a hard disk drive 28a, a series of monitors 28b, and a printer 28c. Also depicted are a series of sensors and transducers 32.

Returning back to FIG. 1, the data compilation engine 12 preferably operates upon a set of input data 20 that may be relatively unformatted (raw data). That is, the input data 20 may be received by the data compilation engine 12 without significant organization. In one embodiment, the input data 20 is arranged in a series of fields 15 and may be drawn from any of a number of possible sources.

The input data 20 may be input into the data compilation engine 12 with any of the input devices 24. For instance, the input data 20 may be stored on a CD ROM disk and received by the data compilation engine 12 through a CD-ROM drive 24a. Many large databases are currently available on CD-ROM, including U.S. Census data, NCES library statistics, records of financial transactions in the world's markets, etc. Any of these sources can provide appropriate input for the Statistical Comparator Interface. Of course, the input data 20 could also be input with other appropriate types of input devices and methods.

Raw data 20, appropriate for analysis by the SCI system 10, may also be found in sources already stored on a computer's hard disk drive 24c, including financial records on a spreadsheet, student records on a database management system, contacts and colleagues on a personal information management application, etc. These are all types of data that would be greatly benefitted by SCI analysis. On the other hand, input data 20 can also be received from other information systems via such means as through a removable high capacity disk drive 24h, or a modem 24d. In the manufacturing realm, on-line system monitoring data can be brought into the SCI system 10 through sensors and transducers 32 with the use of an analog to digital converter 24g.

Not only the sources of the input data 20, but also the types of input data 20 that can E be received and processed by the SCI system 10 are essentially unlimited. The SCI system 10 is preferably adapted to handle qualitative data (categorical) as well as quantitative data, and everything in between. For example, ordinal data is treated by the SCI system 10 as categorical data but with a natural order attached. Since a major intended function of the SCI system 10 is to apply a variety of contrived "orders" to those categories that are unordered and then use those contrived "orders" to make the data pattern more comprehendible, ordinal data works well within the SCI system 10. The definition of "categorical data" is also very broad. The data needn't be numerical in any way, but can be of virtually any nature that can be categorized and counted.

In the depicted embodiment, the data compilation engine 12 is shown comprising a formatting module 11, an indexing module 13, and a series of statistical calculation engines 43 organized into a statistical calculation module 41. With the use of these modules, the data compilation engine 12 preferably compiles the input data 20 and generates a resulting large-scale data architecture 14 that is organized into a designated format navigable by the navigation engine 16. The data compilation engine 12 thus creates a standard data architecture 14 from the raw input data 12 that can be both very large and also very complex. The data architecture 14 is optimized in the sense that it provides a powerful structure which enables efficient and powerful large-scale data visualization and navigation.

The input data 20 is stored within the data architecture 14 as raw data 40. Initially, the raw data 40 is expanded with raw data transformations 42 by a variety of transformations. The input data 20 is initially transformed with additional fields appended to the original fields 15 within the raw input data 20. The new fields may be visualized as columns. Additionally, the raw data 40 is preferably expanded immensely by creating composite data 44 such as means, medians, least squares means, etc. These composite data 44 may be formatted in additional rows, potentially a very large number of which may be appended to the input data matrix and the transformations.

In an additional step, the indexing module may be employed to generate a variety of data structure indices 46, 48, 50. These indices 46, 48, 50 are the numerical foundation of an efficient method for navigating the entire data structure. The navigation engine 16 is the actual data navigation device, but for the navigation engine 16 to be fully effective, the data compilation engine must first generate the data architecture 14 complete with a collection of generated data structure indices 46, 48, 50.

In FIG. 1, the data architecture 14 is shown organized into six general components. The first component is an input matrix 40 consisting essentially of the raw input data 20. The second component is raw data transformations 42. The raw data transformations 42 comprise the broadening of this input matrix 40 in terms of columns (fields) comprising a number of useful transformations on the data which will be explained in greater detail below.

The third component is composite data 44. The composite data 44 is an expansion of the data by rows with the addition of data composites (arithmetic means, medians, least squares means, etc.) for either one-way groupings of data or for two-way or higher groupings.

The last three components, the internal structure indices 46, the relationship and probability indices 48, and the overview indices 50 constitute the collection of data structure indices referred to above. These indices 46, 48, 50 precisely and holistically capture the relationships among all of the sets of the variables that have been created. The indices 46, 48, 50 are organized hierarchically at successively higher levels of abstraction and form the foundation for a strong data navigational system that can precisely target the informational gems in the data as well as holistically capture the total data structure.

The navigation engine 16 is also shown comprising a query engine 17 for the user to specify analysis and display instructions. A profiler module 45 is shown and may be provided for the user to customize a peer group for which statistical information and raw data can be extracted by the navigation engine 16. Also shown is a selection module 19 for the user to select among display types or analysis types. A statistical calculation module 21 is shown, and may be provided for the user to create any additional custom calculations. A depicted graphical depiction module 18 may be provided for graphically displaying selected information extracted from the data architecture 14 in a visually comprehendible manner. Additionally, a user interface module 47 may be provided to provide a graphical user interface for the user in dealing with the above-described modules.

Thus, the navigation engine 16 is a composite system consisting of a number of event-driven process modules that enable the user to navigate through data structures stored in memory and find the nuggets of strong data relationships so that the holistic properties of the large-scale data structures can be captured with precision through the use of a broad variety of graphs and tables.

In the world of computer graphics, there now exists a number of high level, efficient applications for displaying the structure of real or potentially real three-dimensional objects, such as machines, buildings, weather systems, protein structures, etc. However, abstract data also can be thought of as having a structure that can be captured visually. Visually capturing abstract data is the purpose of the navigation engine 16. It is a high level "abstract structure detector" that capitalizes on the human capability of perceiving structure visually. That is why the present invention is described as an interface, it constitutes a man-machine interface that renders complex numerical and categorical information understandable to humans. The purpose of the navigation engine is to deliver to the user optimal visual "hyper shapes" that efficiently capture for the user the totality of data structure, with the capacity to also drill down to the level of each individual data point within the context of the whole.

Although the graphical depiction module 18 may be adapted to produce well-conditioned and meaningful tabular information, its primary focus is preferably graphical. For that reason the most important of the output devices shown in FIGS. 1 and 2 is the computer monitors 28b. While a single monitor 28b could be used, in the depicted embodiment, the SCI system 10 is shown with a plurality of computer monitors 28b which make convergent graphical interpretation possible.

When this kind of high level hardware system is combined with the efficient SCI data visualization architecture, the combination enables the user to literally soar in making sense of a large and complex data set at a very high level. Hard copy through devices such as printers 28c, and the storage and archiving of analytical output on the hard disk 24c, 28a, are also important parts of the process, This archive of results on the hard disk 24c, 28a becomes an audit trail of major data structural discoveries.

The preferred embodiment for both of these major processing systems, the data compilation engine 12 and the navigation engine 16, is in executable computer code, However, other media are possible even though not as efficient. The Statistical Comparator Interface method and process would be successful, albeit limited in size, if it were carried out by clerks armed with nothing but paper and pencil and drafting tools. Thankfully, the wide availability of data processing hardware makes this process possible at a much higher level. For example, the SCI system 10 has been embodied by the inventors in both SAS and Microsoft Access code.

In sum, the SCI system 10 is a method for taking the visual display of quantitative information and the quantitative analysis of data to a much higher level. It expands traditional unitary data analysis techniques into a large-scale process that totally captures the data in many different forms and many ways of expressing it. However, it also can create a massive expansion of the data through spinning out many relationships among variables by the use of higher order composites (such as two-and three-way means, least squares means, etc.). It also renders all of this complexity comprehensible by imposing a disciplined structure, a data architecture 14, on the whole process, and by providing a navigational system in the form of the navigation engine 16.

The data architecture 14 is the essence of the SCI system 10. The Statistical Comparator Interface then can be considered to be, then, both a structure and a method. It is a structure of data in memory storage that enables memorable holistic comparison of cases and composites of cases across a broad variety of quantitative and categorical fields (variables). It is also the process for creating this unique and useful data structure from a broad variety of input data types, ranging from simple to complex.

It should be mentioned that the SCI can also be considered to be an apparatus. As an example of this, consider a common problem in the area of manufacturing—the continual monitoring of the status of all of a company's production systems. When an ordinary digital computer 22 is loaded with the SCI software, it is thereby transformed into a very valuable piece of apparatus—a dashboard for displaying holistically and with quantitative precision the status of all of the manufacturing systems at a given time and as they are changing over time.

The SCI system 10 can be understood both in terms of the data architecture 14 it creates from a matrix of raw input data 20 and also in terms of the processes by which this transformation is accomplished. The data architecture 14 is represented in one embodiment as a formatted data matrix 52 in FIG. 3. The process steps of the data compilation engine 12 by which the data architecture 14 is created are represented in one embodiment in a flow chart diagram in FIG. 4.

Figure 3:
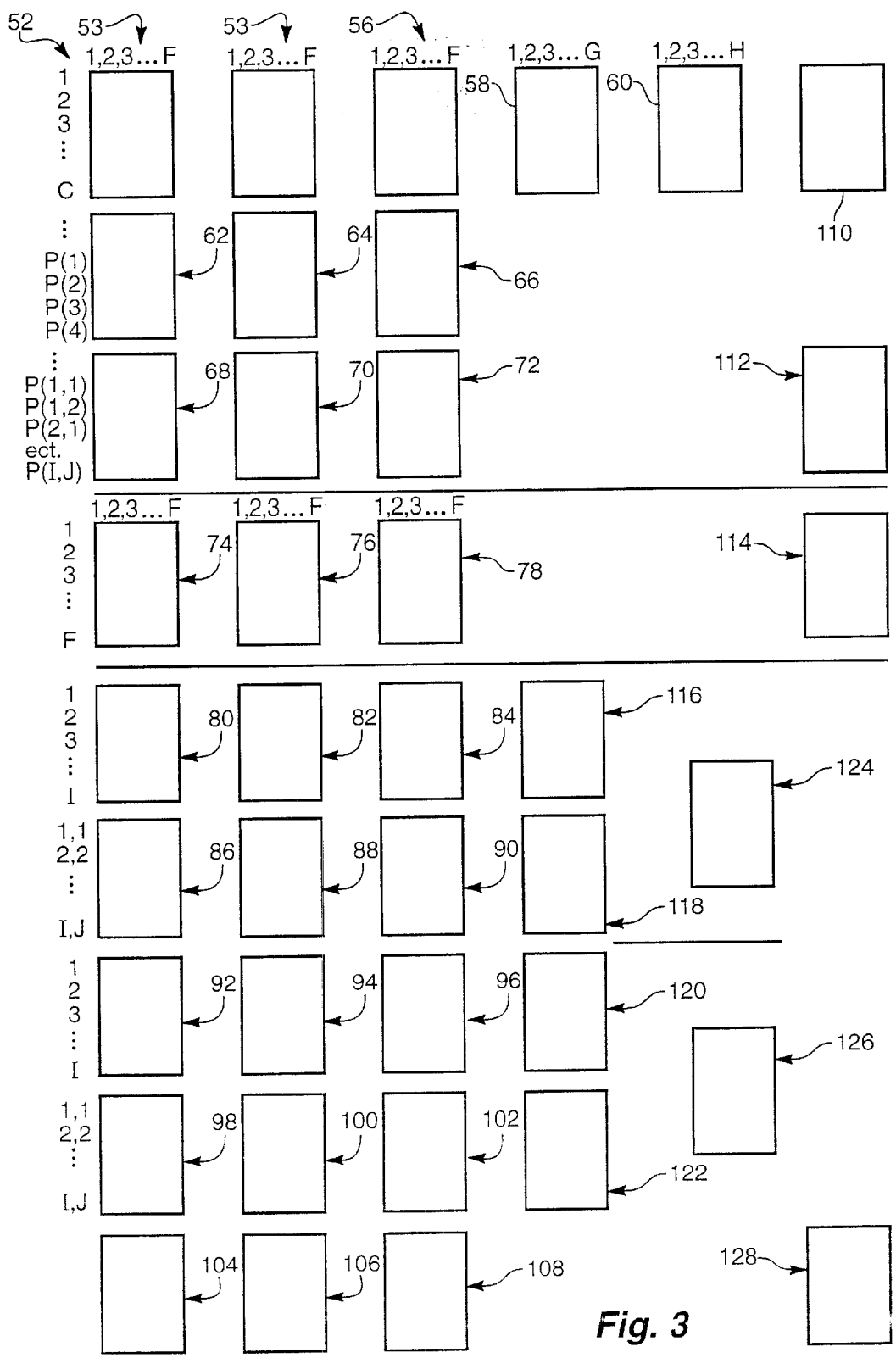
FIG. 3 is a schematic block diagram illustrating a matrix of expanded data as generated by the system of FIG. 1.

First, it will be helpful to provide an overall map to the many types of data structures shown in the formatted data matrix 52 of FIG. 3. It was mentioned in the section above with reference to FIG. 1 that there are essentially six components to data architecture 14. These include the input matrix 40, the raw data transformations 42 (including quantiles, standardized data, etc.), the composite data 44 generated by composite summary statistics (means, etc.) to lengthen this matrix by rows, the internal structure indices 46, the relationship and probability indices 48, and the overview indices 50. The last three of these can be classified as data structure indices and are used as information in their own right but also for aiding navigation through large and complex data structures.

In the matrix 52 of FIG. 3, a block 53 containing raw quantitative data comprising the input data 20 is shown in the upper left corner. Block 53 is composed of C rows, where C is the number of cases, and F columns, where F is the number of fields. Block 53 is also the beginning point for the process outlined in FIG. 4. In the depicted embodiment, the rows constitute the cases or observations of the initial data set, and the columns (fields) constitute the variables on which data is provided for each of the cases.

New columns of data that are created by various transformations on the raw input data 20 data are shown to the right of this matrix as blocks 54, 56, 58, and 60 and correspond to the data transformations 42 on the original raw data that are indicated in FIG. 1. These transformations include such things as standardizing the data, making quantiles (deciles, percentiles, etc.) from the data, etc. Thus, for example, in the depicted embodiment, block 53 represents raw quantitative data, block 54 represents standardized quantitative data, block 56 represents quantile category data, block 58 represents cluster category data, and block 60 represents raw category data.

A third component, corresponding to the composite data 44 of FIG. 1 are contained in six data structures illustrated in a second and a third tier. These are blocks 62, 64, 66, 68, 70, and 72. This composite data can include summary statistics such as means, medians, proportions, least squares means, etc., and can be either one-way, two-way, or higher. For example, one may wish to compare the profile of the local library to the average libraries for the states of New York, New Jersey, and Pennsylvania. The means for these two states constitute one-way composites since the data are averaged only by state. Or, alternatively, one may wish to compare the local library profile to the average of all libraries in New York. that have a holdings/employee ratio above 50. The comparison group here is a two-way composite, since it is averaged both by state and by holdings/employee ratio.

Thus, in the embodiment of FIG. 3, block 62 represents raw quantile composite data, block 64 represents standard quantitative composite data, and block 66 represents quantile category composite data. Block 68 represents two-way or higher quantitative composite data, block 70 represents two-way or higher standard quantitative composite data, and block 72 represents two-way or higher quantile category composite data.

The data structure indices contain high level navigational helps. These are of two types. The first type of indices is the blocks corresponding to the internal structure indices 46. This consists of blocks 74, 76, and 78, and includes such things as correlation matrices, principal components on the correlation matrices, cluster analyses of the fields, etc., that all show how the fields relate to one another. Accordingly, in the depicted embodiment, block 74 represents raw quantitative internal field structure coefficients, block 76 represents standard quantitative internal field structure coefficients, and block 78 represents quantile category internal field structure coefficients.

The second type of indices is represented by the blocks corresponding to the relationship and probability indices 48. This consists of blocks 80 through 102, in the fifth, sixth, seventh, and eighth tiers. Included are such things as F ratios, t statistics, indices of amount of variance accounted for, alpha levels (probability of the Type 1 error in statistical decision theory), etc.

Thus, in the depicted embodiment, block 80 represents relationship indices on one-way raw quantiles, block 82 represents relationship indices on one-way standard quantiles, and block 84 represents relationship indices on one-way quantiles. Block 86 represents relationship indices on two-way or higher raw quantiles, block 88 represents relationship indices on two-way or higher standard quantiles, and block 90 represents relationship indices on two-way or higher quantiles. Block 92 represents probability indices on one-way raw quantiles, block 94 represents probability indices on one-way standard quantiles, and block 96 represents probability indices on one-way quantiles. 98 represents probability indices on two-way or higher raw quantiles block 100 represents probability indices on two-way or higher standard quantiles, and block 102 represents probability indices on two-way or higher quantiles.

The remaining blocks 110–128 of FIG. 3 are shown extending down the right side of the matrix of the page, and blocks 104, 106, and 108 are shown extending along the bottom. These comprise the high level overview indices 50 of FIG. 1. Examples of overview relationship indices in blocks 116 and 118 include multivariate test statistics such as Wilks'lambda, Pillai's trace, Roy's Maximum Root, and the Hotelling-Lawley statistic, and also multivariate "strength of relationship" statistics based upon these. Examples of case structure indices 110 include measures of fit of cases to known distributions (such as Gaussian), skew or kurtosis indices, Q-Q plots, etc. Similar indices can be used to capture higher order properties of the composite data 112. Summary internal field structure indices 114 can include such things as an index of generalized variance (the determinant) for a covariance matrix or a covariance matrix, or indices of the extent to which a correlation matrix is clustered, etc.

Thus, in the depicted embodiment, block 110 represents case structure indices, block 112 represents summary internal field structure indices, and block 114 represents summary internal field structure indices. Block 116 represents multivariate one-way relationship indices, block 118 represents multivariate two-way or higher relationship indices, block 120 represents multivariate one-way probability indices, and block 122 represents multivariate two-way or higher probability indices. Block 124 represents overview multivariate relationship indices, block 126 represents overview multivariate probability indices, and block 128 represents ordinal and grouping information stored for every row and every column of every block in the matrix.

It is important to note that the formatted data matrix 52 is not restricted to the depicted blocks. The depicted blocks represent only classes of matrix fields, of which there can be multiple exemplars.

In the preferred embodiment of the present invention only three types of blocks, blocks 54, 56, and 62, are obligatory. Thus, the process can be accomplished, although less powerfully, with a minimal configuration if the data is classified only in those three blocks. Nevertheless, with only these three matrices, an interface can be formed that is robust, useful, and highly marketable enabling the user to deal with raw data with a clarity, power, and flexibility not previously possible.

Figure 4:
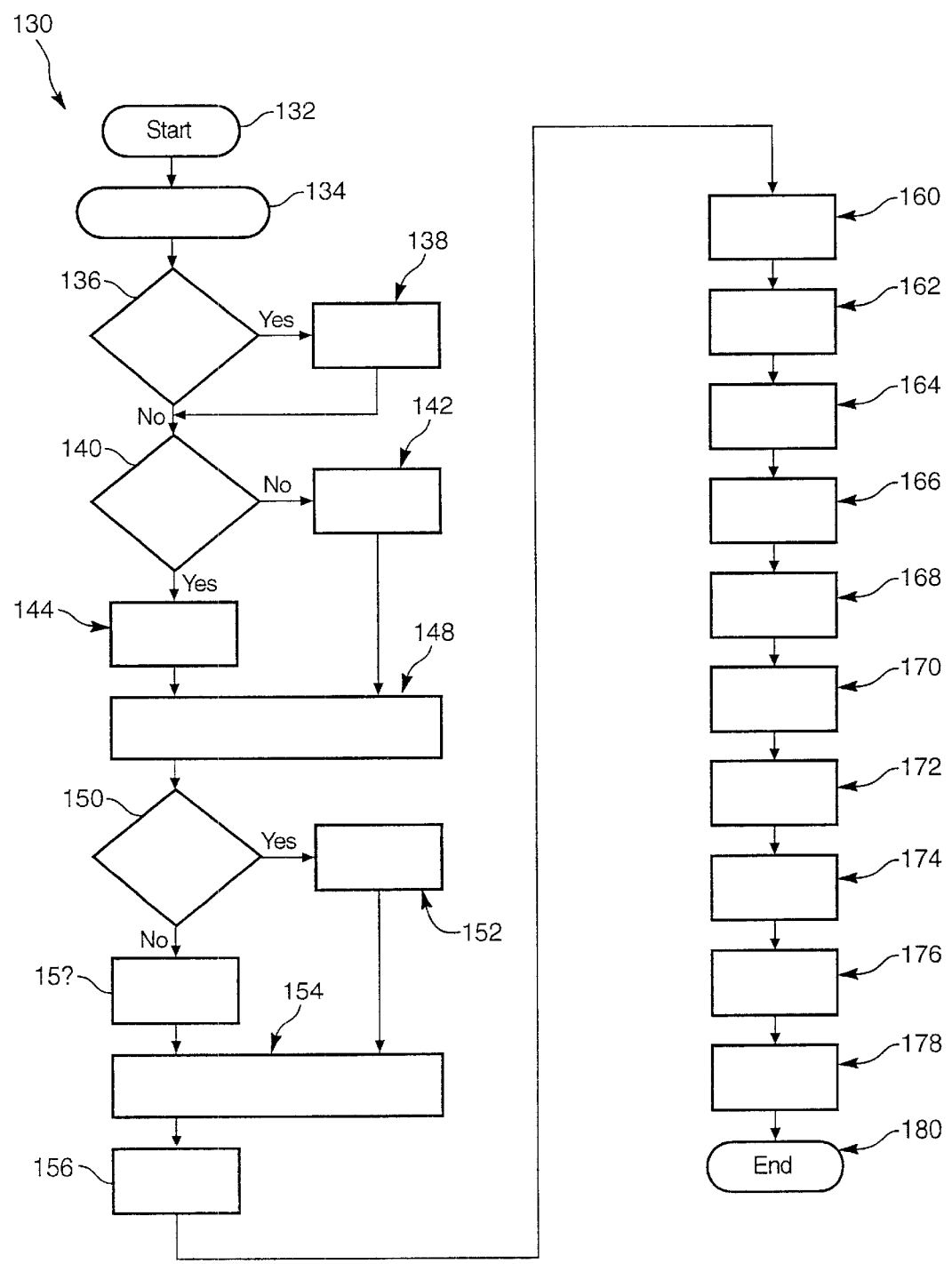
FIG. 4 is a flow chart diagram of a manner of operation of data compilation engine of the present invention.

Referring to FIG. 4, shown therein is a data compilation process 130 by which the data compilation module 12 creates the data architecture 14 described above and shown in one embodiment as a formatted data matrix 52 of FIG. 3. The process 130 begins at a start step 132. At a step 134, the process inputs the raw input data 20 (of FIG. 1) into the beginnings of a formatted data matrix 52 (of FIG. 3) in which the raw quantitative data block, block 53 is filled with the raw data of the input data 20. Thereafter, at a query step 136, the process 130 tests to determine whether there are any categorical data columns within the input data 20. If such columns exist, they are removed from the formatted data matrix 52 at a block 138 and stored in block 60 of the formatted data matrix 52 as raw category data.

At a step 140, the process 130 tests whether all of the remaining fields 15 within the input data 20 are commensurate, that is, expressed in a common comparable measurement scale. If any of the fields 15 are not commensurate with the others, the system then at a step 142 standardizes all fields 15 of data and stores the results in block 54 of the formatted data matrix 52 as standardized quantitative data. If all the fields are commensurate, the process 130 at a step 144 moves the entirety of the commensurate data as is into block 54, as standardized quantitative data. A marker is also turned on to indicate that the data do not need to be standardized. The system then zeroes out block 53 as containing no raw quantitative data.

At a step 148, quantiles are created on all of the fields within block 54 and the quantiles are deposited in block 56 as quantile category data. This enables the user to greatly broaden the way in which the data are considered. Rather than making a sometimes arbitrary decision about what form of the data to use (raw, standardized, percentile, ranked, etc.) this system enables the user to store the data in as many forms as might possibly be useful.

Quantiles can provide useful information in combination with the quantitative form of the same information. For example, it is one thing to know that the Phoenix Public Library has a population served of just slightly over one million, but quite a different thing to know that it is ranked nationally as 32d on this variable. The two provide different and complementary kinds of information. The user can select to have any of a number of types of quantiles, such as percentiles, rank orders, deciles, quartiles, etc., in which case this block 56 could be expanded considerably as a single block, or with additional blocks. It is, however, obligatory to specify at least one type of quantile, since this is crucial to the data expansion steps that follow.

The process 130 then queries at a step 150 whether the user wants to create clusters to capture the structure of the rows of data (cases). If so, the system, at a step 152, calculates some variety of cluster analysis specified by the user in a manner known in the art and generates a corresponding tree structure for display to the user. The basic nature of such a tree structure is shown (without data) in one embodiment in FIG. 7.

The user is provided with the option to select from this tree structure any given level or levels of cluster selection (such as the two clusters at the top, the four farther down, the fifteen even farther down, etc.). The cluster identity of each case in the original data matrix is then recorded in the columns of a block 58 as cluster category data, in accordance with the levels chosen. Generally, there are as many columns as there were cluster levels selected.

If the user did not choose to use clusters, the system zeroes out block 58 in a step 154.

At a step 156, one-way composite summary statistics are computed. The one-way composite summary statistics may be in the form of ordinary arithmetic means. The one-way composite summary statistics may first be computed for the obligatory block 64, then for blocks 62 and 66 if so selected by the user.

At a step 158, the user may select two-way analysis or higher. Upon so doing, all of these higher order factorial composite summary statistics are computed and stored in blocks 68, 70, and 72.

The internal field structure coefficients are created at a step 160 and stored in blocks 74, 76, and 78. These internal field structure coefficients are such things as standard Pearson Product Moment Correlation Coefficients, Coefficients of Determination, angles between the vectors for each field in n-dimensional space, etc. Examples of this kind of data structure are shown in the correlation matrices displayed in the tables of FIGS. 10 and 11. The tables of FIGS. 10 and 11 illustrates the contrast between two contrasting types of correlation matrix structures, clustered and commutative. A paper by two of the authors, Hendrix, S. B. and Brown, B. L., The Surface of Ordered Profiles: A Multivariate Graphical Data Analysis Method, in *American Statistical Association* 1990 *Proceedings of the Section on Statistical Graphics,* published in Alexandria, Va. by the American Statistical Association, gives illustrations of actual empirical data matrices in the field of acoustics that fit closely to each of these idealized matrices.

Figure 12:
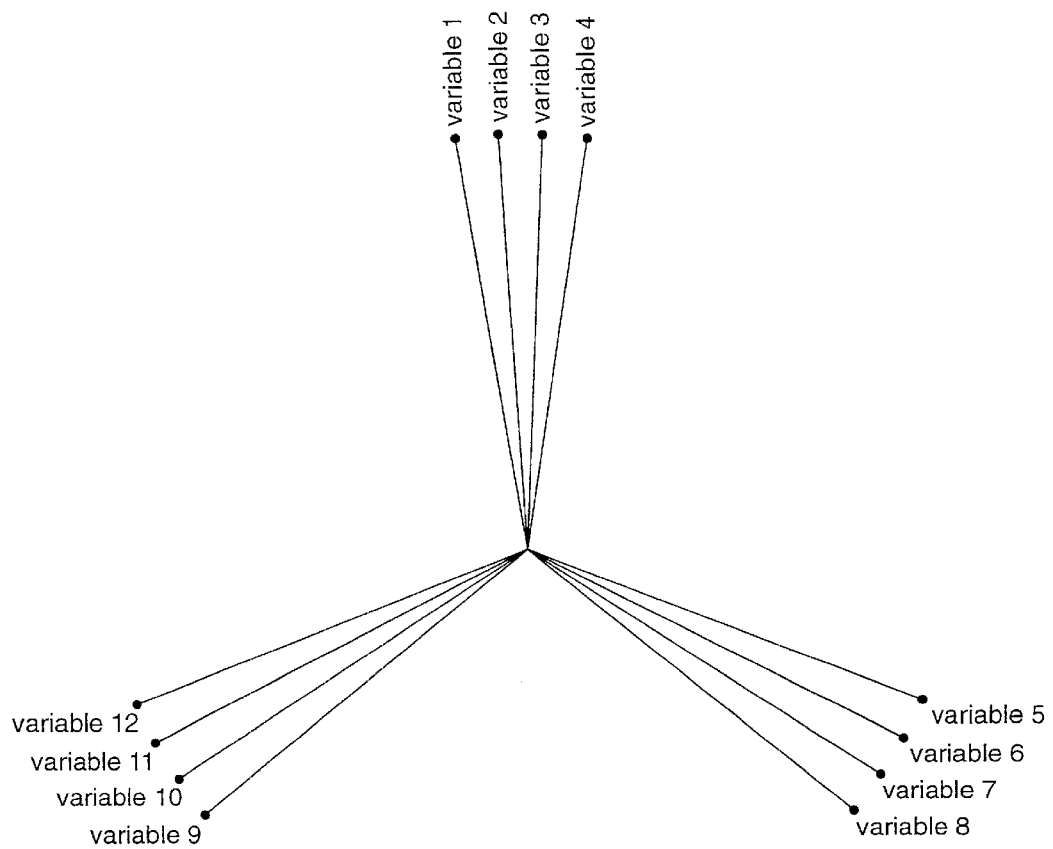
FIG. 12 is a plot of an idealized data set of twelve highly clustered variables in a two-dimensional space illustrating a further example of the graphical output of a graphical depiction module of FIG. 1.
Figure 13:
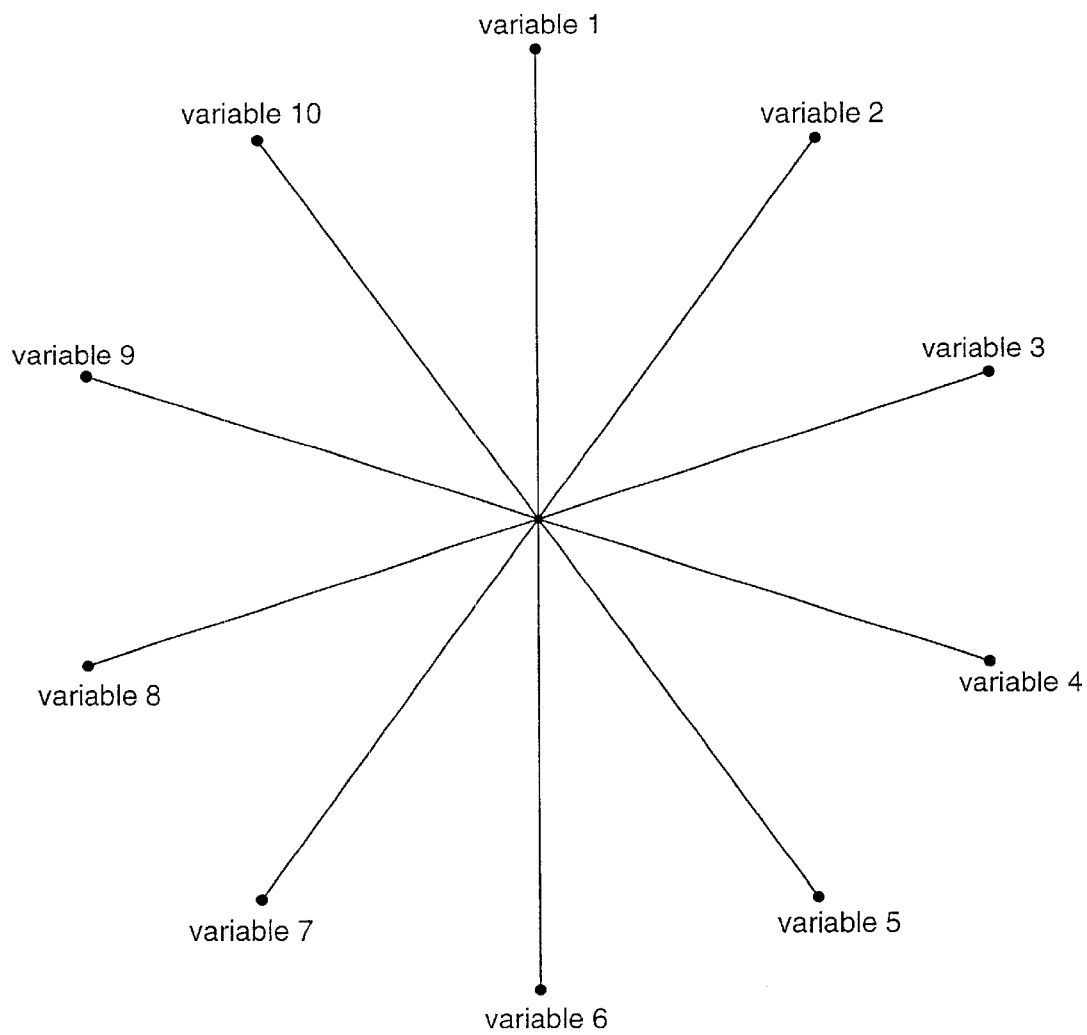
FIG. 13 is plot of an idealized data set of ten commutative variables in a two-dimensional space illustrating a further example of the graphical output of a graphical depiction module of FIG. 1.

Examples of the kinds of figures that can be used to summarize the structural properties of these matrices are given in FIGS. 12 and 13. FIGS. 12 and 13 display the structural contrast between clustered and commutative correlation matrices. This can also be captured with a single number, an index that indicates the extent to which a correlation matrix is clustered.

At a step 162, data is generated for inclusion in blocks 80, 82, and 84. These blocks contain strength of relationship statistics, including such things as the coefficient of determination (r-squared) from regression, eta squared and omega squared from analysis of variance, etc. For each set of means or other composites in blocks 62, 64, and 66 in FIG. 3, there exists one of these statistics telling how well those means account for the variance in raw data for a particular field. At a step 164 similar strength of relationship indices are created for two-way or higher composites for inclusion in blocks 86, 88, and 90.

At a step 166, data is generated for inclusion in blocks 92, 94, and 96, and at a step 168 data is generated for blocks 98, 100, and 102. These blocks contain summary statistics, but rather than being strength of relationship statistics as in blocks 80, 82, 84, 86, 88, and 90, they are the corresponding probability statistics. That is, the data contained in these blocks are merely "p" statistics, where "p" is the standard p in statistical practice (such as "p <0.05), where p is the probability of the Type 1 error in statistical decision theory.

At a step 170 multivariate statistics are created. Whereas the strength of relationship statistics in blocks 80 through 90 and the p value statistics in blocks 92 through 102 are univariate, i.e., there is one for each field or variable, the entries in four special matrix types, 116, 118, 120, and 122 are multivariate. They are shown over at the right of the corresponding block 80 through 102 because they are summaries of multivariate holistic information. They contain the multivariate analogues of the strength of relationship statistics and the p statistics, as is generally known in the field of statistics.

At a step 172, the data to be stored in the blocks 110, 112, and 114 is generated. This data comprises high level summary statistics that summarize the statistics in each of the rows of matrices to their left. For example, block 110 contains things like chi-square data summarizing the extent to which each column or field differs from a known distribution (such as Gaussian). Block 112 contains similar summary statistics for the composite data of blocks 62 through 72. Block 114 contains summary statistics concerning the blocks 74, 76, and 78 which pertain to internal field structure. Examples of the contents of the block 114 include indices concerning correlation matrices, covariance matrices, etc. As a further example, the index of matrix clustering, the determinants, traces, percents of eigenvalues, etc. of all of these matrices are summary statistics of this kind.

At a step 174, overview multivariate indices for relationship indices and probability indices are generated and stored in blocks 124 and 126. Examples of overview multivariate indices include comparisons of multivariate statistics across independent variable partitions, slopes of ordered p-plots of multivariate p statistics, etc.

At a step 176, field profile indices are generated and stored in blocks 104, 106, and 108. Examples of such indices are those that summarize useful descriptive properties of matrices, such as profile similarity indices, indices of generalized variance (the determinant of a matrix), the trace of a matrix (the number of variance units present), the rank of a matrix, indices of multicolinearity, the eigenvalues of a matrix, the cumulative percentages of its eigenvalues, etc. These higher order indices enable the user to make comparisons (graphically or in tables) among many such correlation matrices. These kinds of higher order indices are what is stored in blocks 104, 106, and 108, corresponding to Field Profile Indices, shown at the bottom of FIG. 2.

The Ordinal and Grouping Information block 128 at the bottom of FIG. 3 corresponds to a storage location for the results of all ordering and grouping operations (using cluster analysis, quantiles, etc.) that are performed by the selections from the navigation engine 16. Some of these orderings and groupings may be pre-computed in a step 178. These operations will be discussed below with relation to FIGS. 5 and 6. The process 130 terminates at an end block 180.

Figure 5:
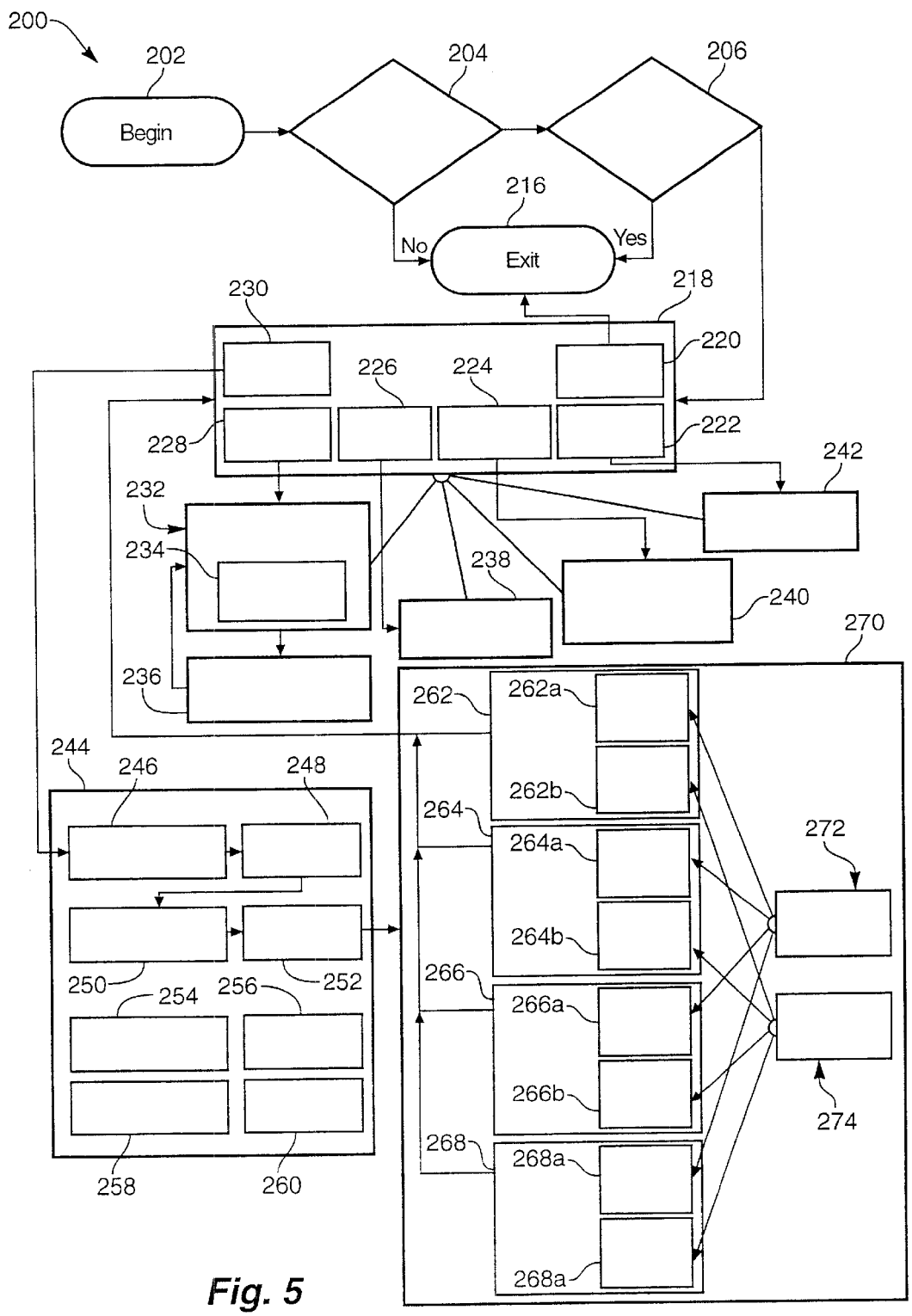
FIG. 5 is a flow chart diagram illustrating a general method of use of a navigation engine of the present invention.

FIG. 5 depicts one embodiment of a general method of use 200 of the navigation engine 16 of FIG. 1. The navigation engine 16, in the depicted embodiment, is based on event-based programming where what is done is very much under user control. Under this arrangement, the user selection of what he wants done initiates processing, display, etc.

The method 200 begins at a step 202. At a step 204, the method 200 does a validity check on the software to make sure that it is authorized. If it is not authorized, e.g., does not have a valid key number, the method terminates at a step 216. If the proper authorization is present, the method 200 progresses to a step 206 where it checks to make sure that the copy of the software in use is current. If the software has expired, the method 200 moves to the step 216 and terminates. If the software is current, the method moves to a select peer groups menu 218. Within the menu 218, the user is presented with a plurality of selections, preferably in menu form, for generating a peer group for which statistical data is desired to be generated and displayed by the navigation engine 16.

The menu 218 presents the user with a selection 220 to exit, a selection 222 to select composite peer groups, a selection 224 to view an alphabetical list of peer groups, a selection 226 to view a categorical list of peer groups, a selection 228 to view a bookmarked list of peer groups, and a selection 230 to move on to a next stage. Using these tools, the user is able to select a customized peer group for which statistical comparisons will be generated and displayed by the navigation engine 16.

Also from this menu 218, the user is able to modify the selected peer group once it has been selected. For instance, the user is, once a peer group is selected, presented with a selection 232 to add peer groups with bookmarks, including a selection to edit bookmarks 234. A selection 236 to edit bookmark lists is also presented. A selection 238 to add peer groups with categories may be presented. A selection 240 to add peer groups with alphabetical list by state may be presented, as may be a selection 242 to add composite peer groups. Composite peer groups are those peer groups for which the compilation engine 12 has generated composite statistics.

Once the peer group is selected and/or modified, the user uses the selection 230 to transition to a statistical category selection menu 244. Within the menu 244 are a plurality of selections, including a selection 246 to select variables to display, a selection 248 to select a data class, a selection 250 to select display type, a selection 252 to go to a display graphics menu, a selection 254 to select bookmark, a selection 256 to delete bookmarks, a selection 258 to create new bookmarks, and a selection 260 to save bookmarks.

When the go to display graphic selection 252 is selected, the method proceeds to a graphical depiction selection menu 270. Within the graphical depiction selection menu 270, the user is presented with the choice to select from among a variety of graphical depiction types represented here by types 262, 264, 266, and 268. The selected graphical depiction types 262, 264, 266, and 268 will then be employed by the graphical depiction module 18 to depict the selected statistical categories for the peer group or groups selected in the menus 218 and 244 by the user.

As discussed above, the various graphical depictions allow the user to select from among a plurality of graphical depiction schemes to display the selected statistical comparisons in a manner that is readily comprehendible to a lay, unindoctrinated user. Additionally, the navigation engine 16 automatically conducts all necessary formatting of the graphical depiction for the selected peer group and categories and the nature of information within the category.

In the depicted embodiment, a smoothed lines display type 262 is provided, as is a radar display type 264, a line display 266, and a clustered bar or single bar display type 268. Of course, any other suitable types of displays could also be included. The menu 270 also provides a selection 262a for display library specifics and a selection 262b for display variable specifics for the smoothed lines display type 262. Similar selections are also provided for the other display types. Once the display type is selected, it may also be customized. Two types of customization are shown in a specific peer group information selection 272 and a specific category information selection 274.

Once a selection of graphical depiction type is made, the method traverses back to the select libraries menu where the user can further customize her analysis or exit.

Figure 6:
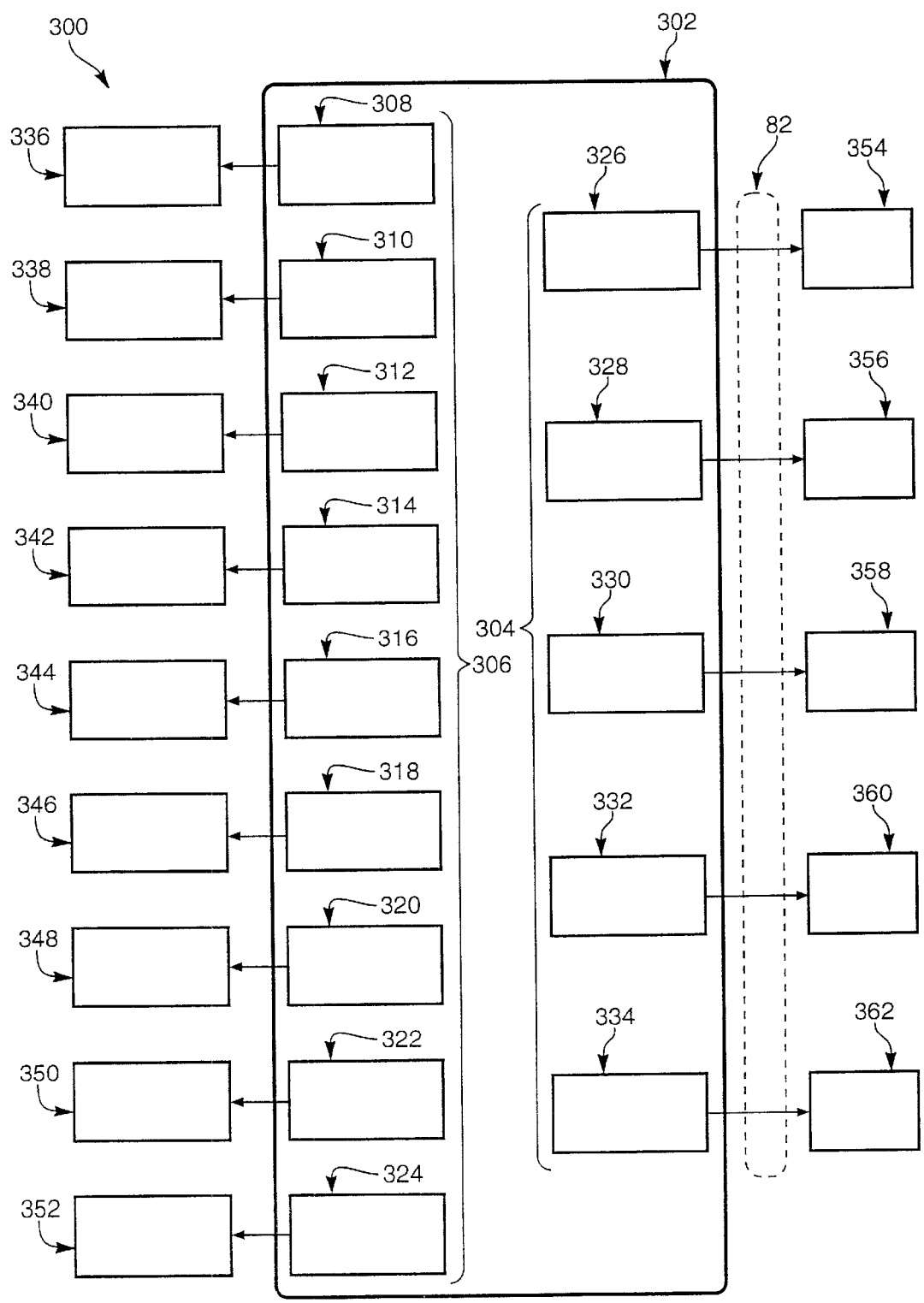
FIG. 6 is a schematic block diagram illustrating one manner of operation of a navigation engine of the present invention.

FIG. 6 depicts one manner of operation of the navigation engine 16 in providing the user with the method 200 discussed above. In FIG. 6, five display formats 304 from which the user can select are shown arranged on the right side of a master selection menu 302 and nine types of pre-display formatting selections 306 that are under user control are arranged on the left side of the menu 302.

The formatting selections 306 comprise, in the depicted embodiment, a subset of fields selection 308, a ordering of fields selection 310, a grouping of fields selection 312, a subset of cases selection 314, a ordering of cases selection 316, a grouping of cases selection 318, a subset of composites selection 320, a ordering of composites selection 322, and a grouping of composites selection 324. These selections correspond to three general types of operations (select subset, select ordering, and select grouping), applied to each of three kinds of data (fields, cases, and composites.)

As an example of how the formatting selections 306 are used, consider the case where the peer groups comprise libraries. To select a subset of cases, a user might be interested in restricting all of the analyses to only the forty largest libraries in America by number of holdings. In that case the user would, in the select libraries menu 218 of FIG. 5, make the appropriate selection from the category list selection 226.

The navigation engine would then resort to an appropriate quantile column in the formatted data matrix 52 of FIG. 3. Specifically, the column 56 for rank order would be examined, using the appropriate indices to navigate there by the navigation engine 16. The navigation engine 16 would then select therefrom a subset of forty libraries from the whole data set of libraries (8984 currently) and restrict further analysis to the forty until the user opts to alter the selected peer group.

Alternatively, the user might wish to keep all libraries in the data set but wish to group them into ten equal sized groupings according to number of holdings. The navigation engine 16 would then display for the user a scatter plot of all of the libraries in the dimensional space of two or three selected fields and color and connect the data points according to which of these ten groupings they belong to. Thus, quantiles can be used to select subsets or to group.

Quantiles also can be used to order, of course, such as placing all forty of the top libraries in a bar graph with the bars organized in descending order of number of holdings, and perhaps the height of the bar showing circulations per capita. This provides an interesting way of viewing the relationship between number of holdings and circulations per capita for the subset of these forty libraries. Quantiles can obviously also be used to group, select, and order composite summary statistics and fields. Another technique for ordering, selecting and grouping fields, cases, and composites is cluster analysis.

Figure 7:
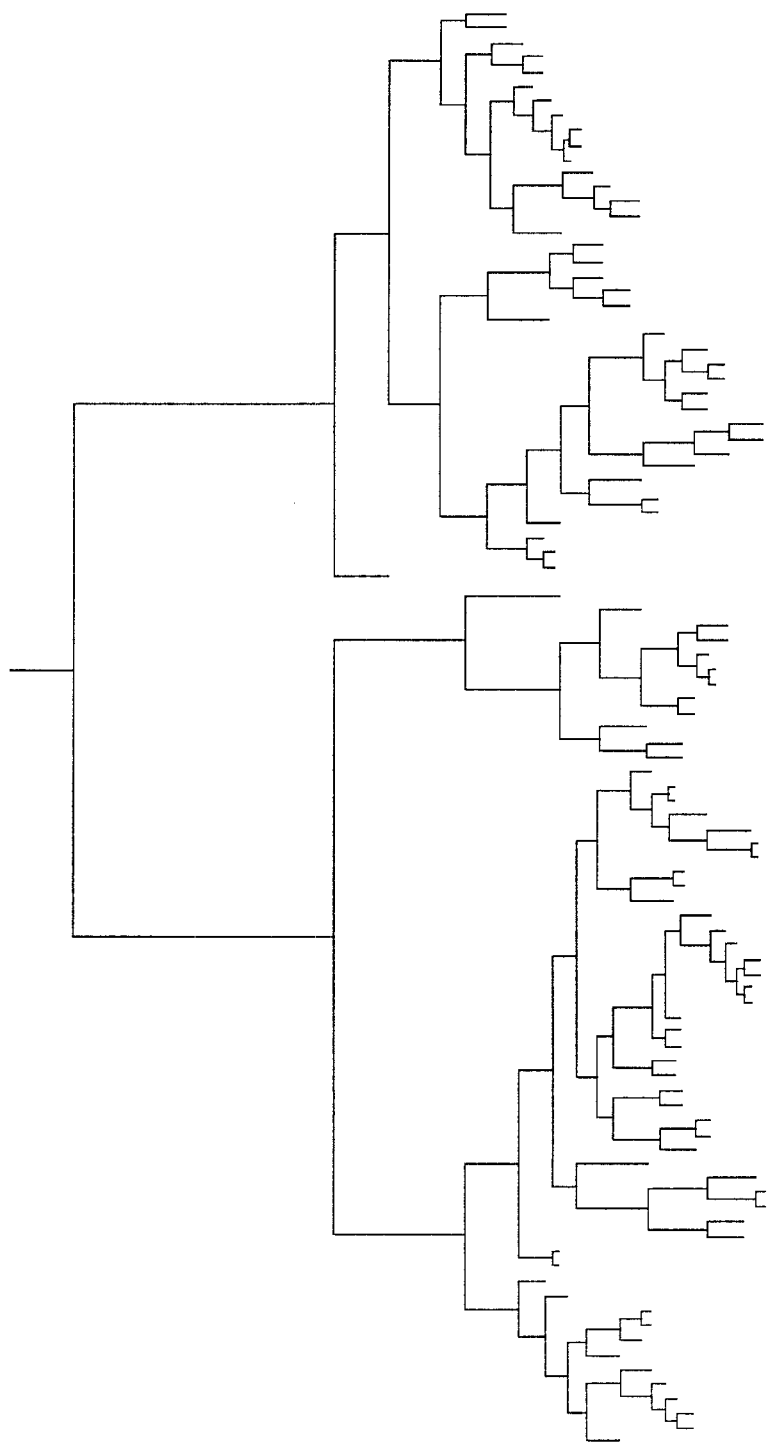
FIG. 7 is a tree diagram illustrating one example of the graphical output of a graphical depiction module of FIG. 1.

There is some discussion above about the use of cluster analysis to create tree structures like the one shown in FIG. 7. This kind of tree analysis of a set of data fields (variables) could be used to select a subset of fields for some analysis, to group empirically similar fields in a graphical presentation, or to order the fields according to the tree structure to make profiles more comprehendible.

Figure 8:
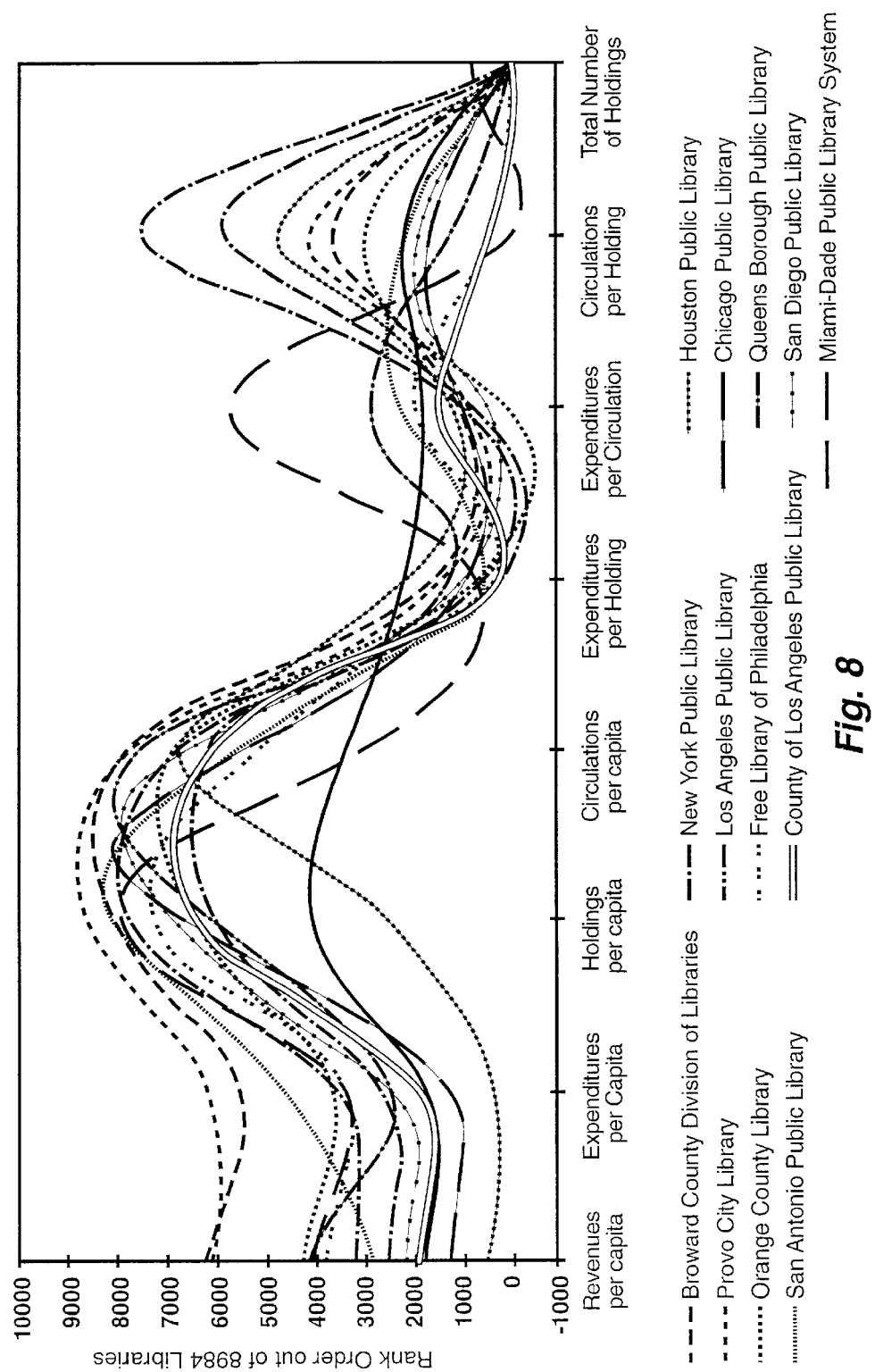
FIG. 8 is an unordered spline profile of libraries illustrating a further example of the graphical output of a graphical depiction module of FIG. 1.
Figure 9:
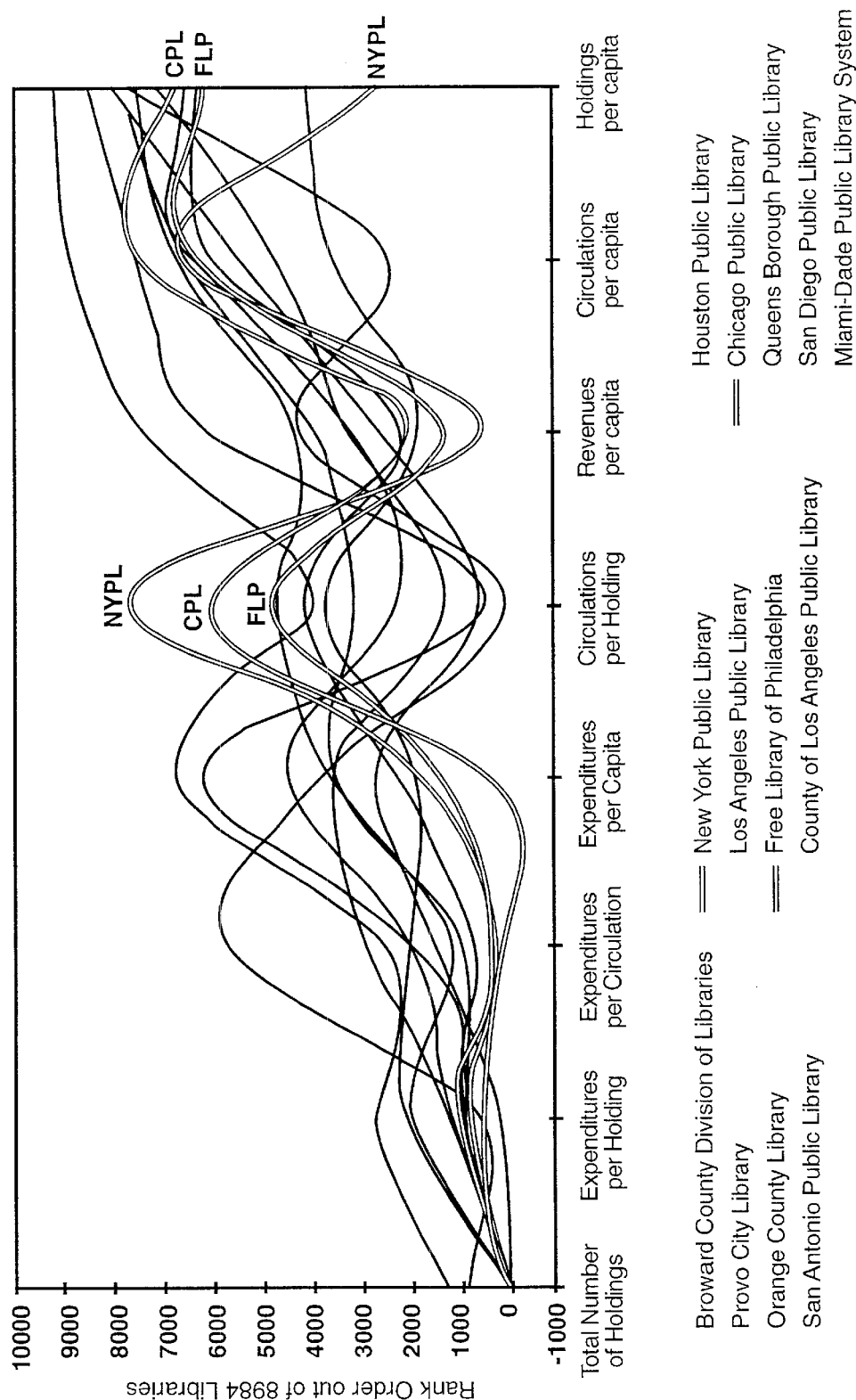
FIG. 9 is an ordered spline profile of libraries with three libraries highlighted illustrating a further example of the graphical output of a graphical depiction module of FIG. 1.

The use of the ordering of fields to make profiles easier to visually interpret is illustrated in FIGS. 8 and 9. FIG. 8 shows thirteen large libraries and one smaller one, Provo, plotted on a smoothed line graph on eight standardized fields (total number of holdings, circulations per holding, etc.) FIG. 9 is similar to FIG. 8, except that the fields have now been ordered from left to right according to the summed rank on each (lowest on the left and highest on the right. This gives the figure an overall slant from lower left up to upper right. Just this simple ordering method begins to create a visual grouping into similar profiles that can provide important insights into data structure. Also, in FIG. 9 three similar profiles have been highlighted and they correspond to three large eastern libraries.

Accordingly, when the user selects one of the menu selections 308 through 324, the appropriate software program module 336 through 352 is called up by the navigation engine and is executed.

Since the navigation engine 16 is event driven, this preselection and storage of orderings, selection of subgroups, and grouping of the fall group is under user control. It provides limitless possibilities for exploring data, coupled with the efficiency of a well structured, pre-programmed engine. The five kinds of display formats 304 that are possible once the user has preselected formatting options 306 with respect to fields, cases, and composites will now be explained. Once again, selecting one of the display formats 304 results in the navigation engine 16 calling up the appropriate module 354–362 for responding to the user selection.

Figure 14:
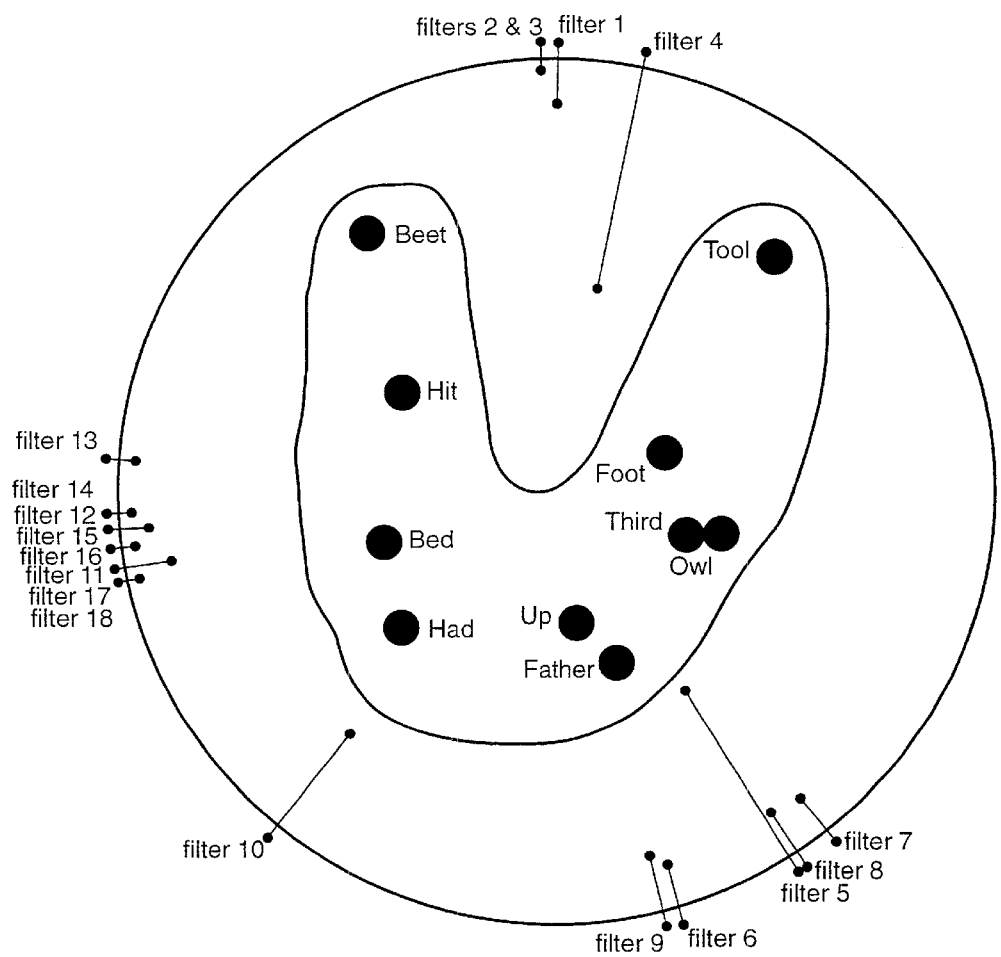
FIG. 14 is plot of vowel sounds showing a vowel crescent and clusterings of axes of eighteen filters illustrating a further example of the graphical output of a graphical depiction module of FIG. 1.
Figure 15:
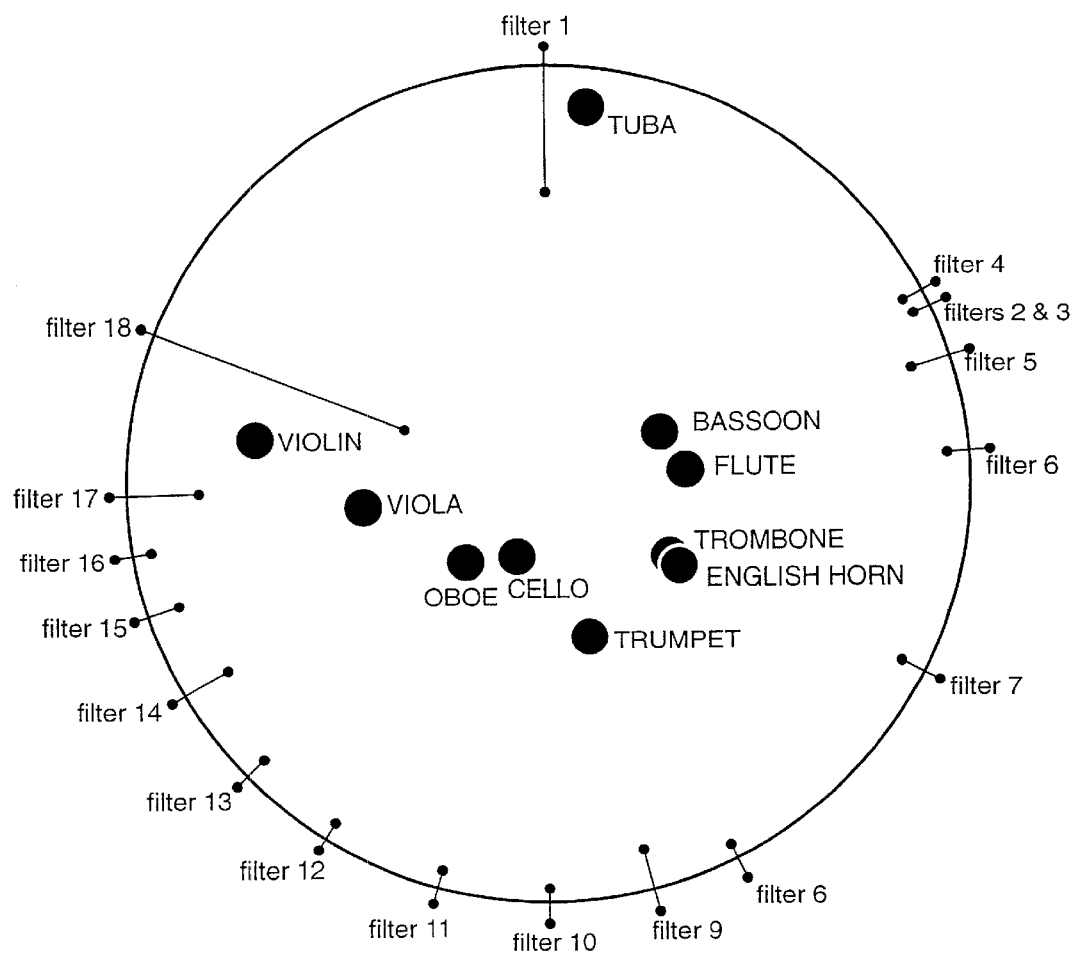
FIG. 15 is a plot of instrument sounds showing commutative structure of axes of eighteen filters illustrating a further example of the graphical output of a graphical depiction module of FIG. 1.

Selection 326 of FIG. 6 deals with displays that show relationships between cases, fields, and composites in any combination of the three. These are the fundamental, essential graphics types for this kind of analysis and can include a large variety of types of graphs. As examples of these displays, the example given above in which we compared FIGS. 8 and 9 to illustrate the salutary visual effects of ordering is a type of display that shows the relationship between cases and fields. In both figures, profiles are presented of fourteen libraries (cases) according to their respective rankings on eight variables (fields). FIGS. 14 and 15 present a very different kind of "fields by cases" visual display. Here the fields (eighteen acoustic frequency band variables) are used to define a two dimensional acoustic space.

Obviously the spaces differ in terms of the structure of the eighteen vectors, with the eighteen being much more evenly spaced when applied to musical instrument data points (cases) in FIG. 15, as compared to vowel sound data points (cases) in FIG. 14. Hendrix and Brown, 1990 provides an explanation of how to read these graphs that combine data points and vectors into a common space. Both of these kinds of graph could have been just as well used to examine composites as they relate to fields. We would just substitute averaged data in the space of the variables rather than raw data.

Selection 328 deals with tables and graphs that explicate the internal structure of a group of variables. This can be illustrated with the ideal data in Table 1 and the real empirical data in Table 2. The four matrices in these two tables are all examples of internal field structure coefficients, Notice that the coefficients in the matrix of part a of Table 1 are "clustered." That is, they lie in a patchwork, with rectangles of large and small values (see Hendrix and Brown, 1990). On the other hand, the coefficients in the matrix of part b of that Table are "commutative" (also called Toeplitz structure), with the coefficients of similar magnitude running in diagonal stripes through the matrix.

FIG. 12 and FIG. 13 show the location of the vectors for the variables in these matrices plotted within a two-dimensional space. Clearly the clustered data (FIG. 12) consists of three clusters of four variables each, and the commutative data (FIG. 13) has ten variables fanned out equally spaced throughout the 360 degrees of the space. The navigation engine enables the user to rapidly bring up graphs and tables of these types which all converge to explicate data structure.

Figure 16:
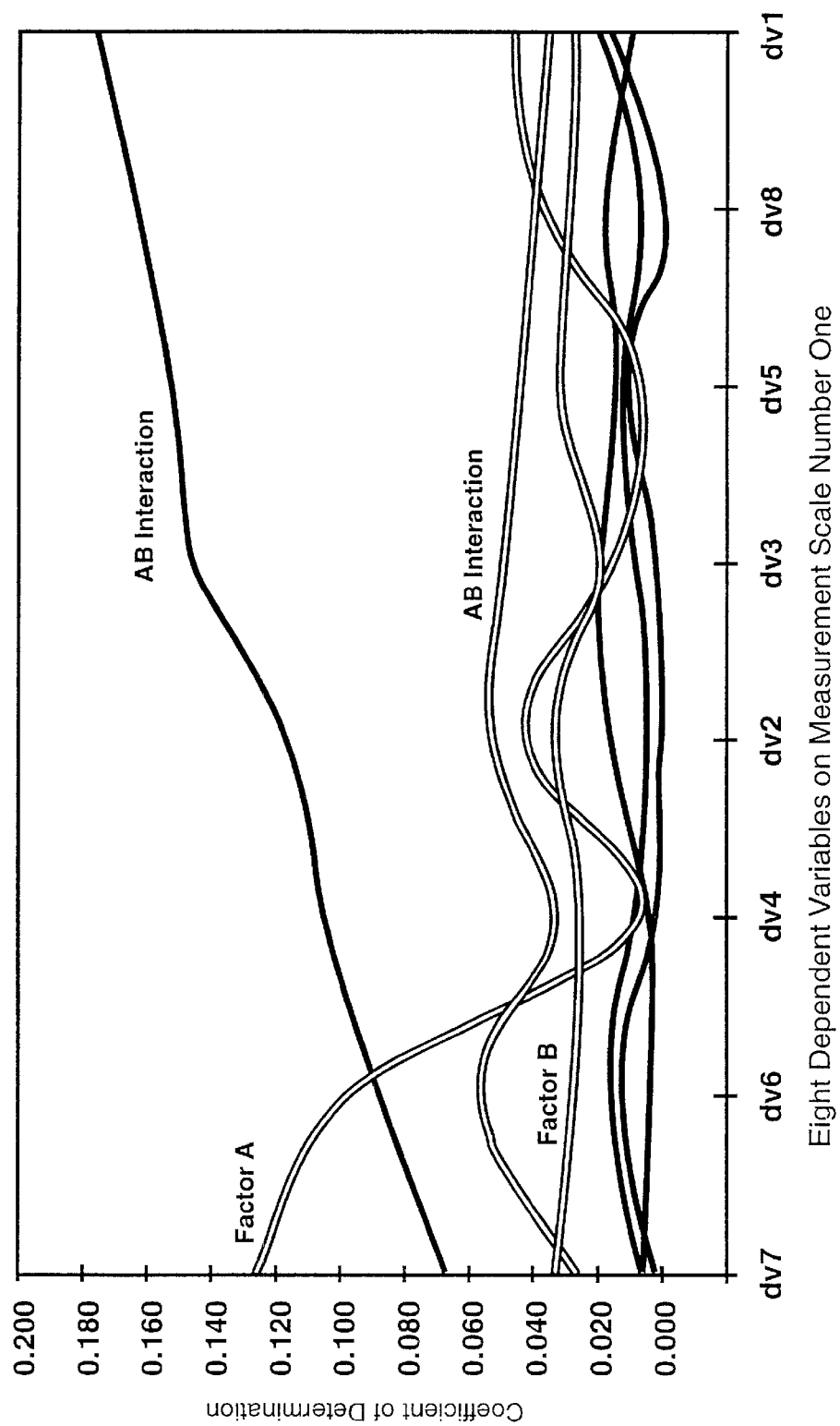
FIG. 16 is a strength of relationship index profile for three factors, A, B, and C, three two-way interactions, AB, AC, and AD, and one three-way interaction on eight dependent variables of scale one illustrating a further example of the graphical output of a graphical depiction module of FIG. 1.

Selection 330 is illustrated in FIG. 20. Typically the analysis will have a more complex structure than this. FIG. 16 displays simple two-way analysis of variance "strength of relationship" statistics. The vertical axis is the Coefficient of Determination computed from the Sums of Squares on the Analysis of Variance. There are seven of these statistics (corresponding to tests of factor A, factor B, factor C, AB, AC, and ABC interactions) for each of the eight dependent variables of FIG. 20 and each of the, nine dependent variables of FIG. 21. We have ordered the dependent variables to make the profiles maximally readable. We can see that on FIG. 16, the AB interaction is by far the strongest effect, factor A is only higher on dv7 and dv6.

Selection 334 displays the highest level overview summaries of comparative multivariate statistics over all analyses of composites. This is used to summarize the extent to which each matrix is clustered or commutative, such that a single numerical index is used to classify each matrix. A broad variety of other indices of internal structure, such as the determinant of the correlation or covariance matrix, the trace of the matrix, its rank, the percents of variance accounted for by each of its eigenvalues, etc., can be graphed. Graphical methods such as scatter plots are selectable by the user to be used to compare many such correlation matrices within a single figure. These are the "highest level overview summaries" of selection 334. These summaries are displayed with the same graphical types illustrated above for lower level case and composite data: splines, scatter plots, tree diagrams, etc.

The SCI described herein is suitable for use on pregenerated input data 20 and can also be used for contemporaneously generated data, such as data received upon the sensors 32 of FIG. 2. In this manner, complex variables and large amounts of data can be tracked and analyzed during operation of a manufacturing plant or the like.

Additionally, in one preferred embodiment, the input data 20 is provided as a service. That is, the data is provided by subscription and is updated regularly. Accordingly, the gathering of large amounts of data is efficient for individual entities such as libraries, schools, etc., that would not have the resources or know how available to gather the data by themselves.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United State Letters Patent is:

1. An apparatus for presentation of an image in three or less dimensions of numerical data from a domain having more dimensions than the image, the apparatus comprising:
   a processor for executing instructions;
   a memory device operably connected to the processor to store data structures of both executable and non-executable, operational, types for use by the processor, the data structures comprising:
      raw data comprising values of points in a multi-dimensional space defined by more than three dimensions, each dimension defined by a corresponding raw dimensional variable,
      a compilation module configured to automatically restructure the raw data from the raw dimensional variables into formatted data represented by a plurality of sets of orthogonal axes, each set of the plurality of orthogonal axes having no more than three dimensions, and each axis of each set created as a linear combination of the raw dimensional variables;
      a navigation engine configured to present to a user the plurality of sets, receive from a user a selection of a selected set from the plurality of sets, and display to a user the formatted data as a three-dimensional object in the space defined by the selected set.

2. The apparatus of claim 1, wherein each raw dimensional variable is a contributor to at least one of the sets.

3. The apparatus of claim 2, wherein the compilation module further comprises at least one statistical calculation engine for generating statistical derivations from the raw data and a formatting module for organizing the statistical derivations into the formatted data.

4. The apparatus of claim 3, wherein the formatted data includes the raw data and statistical derivations extracted from the raw data.

5. The apparatus of claim 4, wherein the statistical derivations include quantiles and standardized information.

6. The apparatus of claim 4, wherein the formatted data includes composite data.

7. The apparatus of claim 4, wherein the formatted data includes correlation coefficients.

8. The apparatus of claim 4, wherein the compilation module further comprises an indices generation module for generating indices to be included within the formatted data, the indices adapted to enhance the navigability of the formatted data by the navigation engine.

9. The apparatus of claim 8, wherein the navigation module is adapted to utilize indices within the formatted data to quickly respond to user requests to generate and display a three-dimensional object corresponding to a selected set.

10. The apparatus of claim 9, wherein the navigation module further comprises a profiler module, the profiler module adapted to compare the formatted data corresponding to a peer group selectable by a user.

11. The apparatus of claim 10, wherein the profiler module is adapted to alter the peer group and categories of the formatted data corresponding to the peer group according to instructions received from a user.

12. The apparatus of claim 11, wherein the navigation engine further comprises:
   a user interface module adapted to provide a control interface to the compilation module and navigation engine;
   a selection module for automatically selecting a suitable statistical calculation engine for generating information according to the nature of data represented.

13. The apparatus of claim 12, further comprising a graphical depiction generation module adapted to depict the formatted data in any one of a plurality of distinct graphical depiction options selectable by a user.

14. The apparatus of claim 13, wherein the graphical depiction generation module is adapted to automatically select a best mode of display of the formatted data according to the nature thereof.

15. The apparatus of claim 14, wherein the graphical depiction generation module is configured to illustrate relationships between information within the formatted data in a readily understood format, without training a user in the use thereof.

16. A computer readable medium having thereon data structures and executables for executing the data structures, the data structures and executables comprising:

a compilation module configured to automatically restructure raw data comprising values of points in a multi-dimensional space defined by more than three dimensions, each dimension defined by a corresponding raw dimensional variable, from the raw dimensional variables into formatted data represented by a plurality of sets of orthogonal axes, each set of the plurality of orthogonal axes having no more than three dimensions, and each axis of each set created as a linear combination of the raw dimensional variables;

a navigation engine configured to present to a user the plurality of sets, receive from a user a selection of a selected set from the plurality of sets, and display to a user the formatted data as a three-dimensional object in the space defined by the selected set.

17. The computer readable medium of claim 16, wherein the compilation module further comprises at least one statistical calculation engine for extracting statistical information from the raw data and a formatting module for expanding the raw data into a matrix of formatted data including statistical composites generated by the statistical calculation engine.

18. The computer readable medium of claim 17, wherein:

the compilation module further comprises an indexing module for hierarchically indexing the formatted data with indices; and the navigation module is configured to utilize the indices to quickly respond to user requests to generate and display selected information in the formatted data.

19. The computer readable medium of claim 18, further comprising:

a user interface module adapted to provide a control interface to the compilation module and navigation engine;

a selection module for automatically selecting a suitable statistical calculation engine for generating information according to the nature of data represented.

20. The computer readable medium of claim 19, further comprising a graphical depiction generation module adapted to depict the formatted data in any one of a plurality of distinct graphical depiction options selectable by a user.

21. The computer readable medium of claim 20, wherein the graphical depiction generation module is adapted to automatically select a best mode of display of the formatted data according to the nature of the data contained therein.

22. A method of extracting information selected by a user from raw data and displaying the information to the user in a readily comprehendible format, the method comprising:

providing raw data comprising values of points in a multi-dimensional space defined by more than three dimensions, each dimension defined by a corresponding raw dimensional variable, automatically restructuring the raw data from the raw dimensional variables into formatted data represented by a plurality of sets of orthogonal axes, each set of the plurality of orthogonal axes having no more than three dimensions, and each axis of each set created as a linear combination of the raw dimensional variables;

presenting to a user the plurality of sets, receive from a user a selection of a selected set from the plurality of sets, and display to a user the formatted data as a three-dimensional object in the space defined by the selected set.

23. The method of claim 22, further comprising extracting statistical information from the raw data and formatting the raw data and statistical information into a formatted data matrix.

24. The method of claim 23, further comprising:

hierarchically indexing the formatted data with indices; and navigating the indices to quickly respond to user requests to generate and display selected information in the formatted data.

25. The method of claim 24, further comprising:

providing a user interface module adapted to provide a control interface to the compilation module and navigation engine; and automatically selecting suitable statistical information to extract from the formatted data according to the nature of the data contained therein.

26. The method of claim 25, further comprising depicting the formatted data in any one of a plurality of distinct graphical depiction options selectable by a user.

27. The method of claim 26, further comprising automatically selecting a best mode of display of the formatted data according to the nature of the data contained therein.

* * * * *